US012445939B2

(12) United States Patent
Lei et al.

(10) Patent No.: US 12,445,939 B2
(45) Date of Patent: Oct. 14, 2025

(54) STRUCTURE OF MINIMUM SI

(71) Applicant: QUALCOMM Incorporated, San Diego, CA (US)

(72) Inventors: Jing Lei, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 18/052,565

(22) Filed: Nov. 3, 2022

(65) Prior Publication Data

US 2024/0155465 A1 May 9, 2024

(51) Int. Cl.
*H04W 48/10* (2009.01)
*H04W 72/04* (2023.01)

(52) U.S. Cl.
CPC ........... *H04W 48/10* (2013.01); *H04W 72/04* (2013.01)

(58) Field of Classification Search
None
See application file for complete search history.

(56) References Cited

U.S. PATENT DOCUMENTS

| 10,548,123 | B2* | 1/2020 | Ouchi | H04W 72/30 |
|---|---|---|---|---|
| 2013/0136098 | A1* | 5/2013 | Li | H04W 72/23 370/329 |
| 2018/0199273 | A1* | 7/2018 | Chun | H04W 48/14 |
| 2019/0173726 | A1* | 6/2019 | Wong | H04L 27/3405 |
| 2020/0137669 | A1* | 4/2020 | Lee | H04W 72/23 |
| 2022/0294569 | A1* | 9/2022 | Matsuda | H04W 72/20 |
| 2023/0164781 | A1 | 5/2023 | Kim et al. | |

FOREIGN PATENT DOCUMENTS

| WO | 2021230730 A1 | 11/2021 |
|---|---|---|
| WO | 2021245598 A1 | 12/2021 |
| WO | 2022029266 A1 | 2/2022 |

OTHER PUBLICATIONS

International Search Report and Written Opinion—PCT/US2023/034472—ISA/EPO—Apr. 8, 2024.

(Continued)

*Primary Examiner* — Hong S Cho
(74) *Attorney, Agent, or Firm* — Procopio, Cory, Hargreaves & Savitch Li.P/Qualcomm Incorporated

(57) ABSTRACT

A UE may receive an indication of a first assignment of a first PDSCH via a PBCH from a network entity. The first PDSCH may include at least a first portion of a SIB. The UE may receive the first portion of the SIB via the first PDSCH from the network entity based on the first assignment of the first PDSCH. The first portion of the SIB may include access control information for the network entity and the assignment for a second portion of the SIB. The UE may identify whether the UE is permitted to access the network entity based on the access control information for the network entity.

48 Claims, 18 Drawing Sheets

(56) References Cited

OTHER PUBLICATIONS

3GPP TS 38.214: "3rd Generation Partnership Project; Technical Specification Group Radio Access Network; NR; Physical Layer Procedures for Data (Release 17)", V17.3.0, 3rd Generation Partnership Project, Mobile Competence Centre, 650, Route Des Lucioles, F-06921 Sophia-Antipolis Cedex, France, Sep. 21, 2022, XP052273418, 230 pages, paragraph 5.1.2, paragraph 5.1.3, paragraph 5.1.4.

3GPP TS 38.331: "3rd Generation Partnership Project; Technical Specification Group Radio Access Network; NR; Radio Resource Control (RRC) Protocol Specification (Release 17)", 3rd Generation Partnership Project, Mobile Competence Centre, 650, Route Des Lucioles, F-06921 Sophia-Antipolis Cedex, France, vol. RAN WG2, No. V17.2.0 , Oct. 2, 2022, XP052211372, 1295 pages, pp. 1-1298, paragraph 5.2.2.4.1.

Partial International Search Report—PCT/US2023/034472—ISA/EPO—Jan. 23, 2024.

\* cited by examiner

STRUCTURE OF MINIMUM SI

TECHNICAL FIELD

The present disclosure relates generally to communication systems, and more particularly, to a communication of system information in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive an indication of a first assignment of a first physical downlink shared channel (PDSCH) via a physical broadcast channel (PBCH) from a network entity. The first PDSCH may include at least a first portion of a system information block (SIB). The apparatus may receive the first portion of the SIB via the first PDSCH from the network entity based on the first assignment of the first PDSCH.

In an aspect of the disclosure, a method, a computer-readable medium, and an apparatus are provided. The apparatus may be a user equipment (UE). The apparatus may receive a first portion of a SIB from a network entity. The first portion of the SIB may include access control information for the network entity and may indicate an assignment of a second PDSCH if the access control information indicates that the UE is permitted to access the network entity. The apparatus may identify whether the UE is permitted to access the network entity based on the access control information for the network entity.

In an aspect of the disclosure, a method, a computer-readable medium, and an apparatus are provided. The apparatus may be a network entity. The apparatus may transmit, for a UE, an indication of a first assignment of a first PDSCH via a PBCH. The first PDSCH may include at least a first portion of a SIB. The apparatus may transmit, for the UE, the first portion of the SIB via the first PDSCH based on the first assignment of the first PDSCH.

In an aspect of the disclosure, a method, a computer-readable medium, and an apparatus are provided. The apparatus may be a network entity. The apparatus may transmit, for a UE, a first portion of a SIB. The first portion of the SIB may include access control information for the network entity. The UE may be or may not be permitted to access the network entity based on the access control information for the network entity. The apparatus may transmit, for the UE, a second portion of the SIB via a second PDSCH based on a second assignment of the second PDSCH if the UE is permitted to access the network entity. The second assignment of the second PDSCH may be based on the first portion of the SIB if the UE is permitted to access the network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
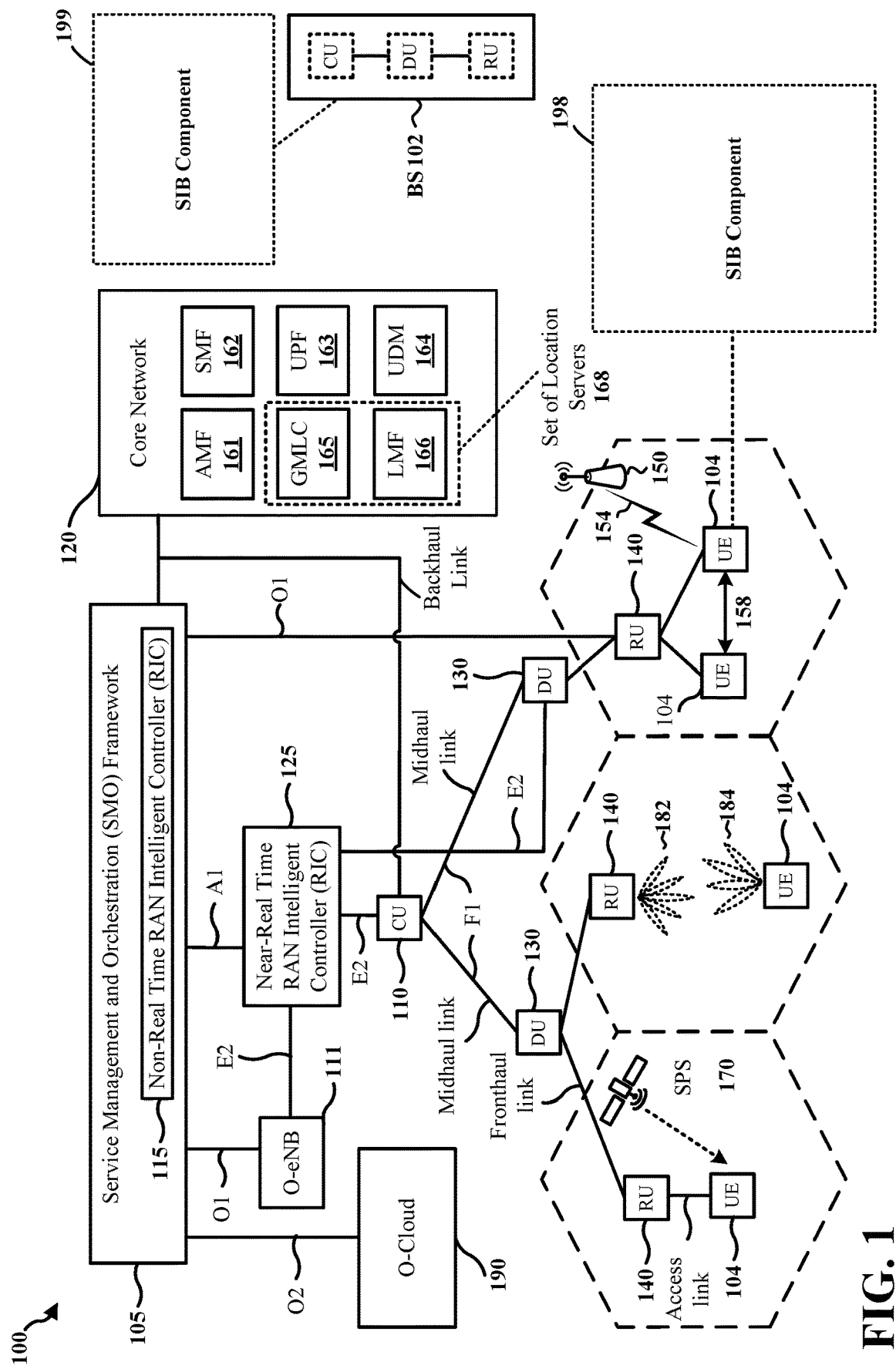
FIG. 1 is a diagram illustrating an example of a wireless communications system and an access network.

In some configurations, to acquire the SIB1, a UE may monitor the TypeO-common search space (CSS) set, and may blind decode the scheduling physical downlink control channel (PDCCH) (e.g., the control resource set (CORESET) #0) of the SIB1. For a UE to identify whether the UE is authorized to access a network entity, the UE may decode a large transport block (TB) (e.g., more than 300 bytes), even though the access/barring control information may occupy much less space. It may be desirable to improve the efficiency of minimum system information (MSI) delivery or decoding.

According to one or more aspects, a UE may receive an indication of a first assignment of a first PDSCH via a PBCH from a network entity. The first PDSCH may include at least a first portion of a SIB. The UE may receive the first portion of the SIB via the first PDSCH from the network entity based on the first assignment of the first PDSCH. The first portion of the SIB may include access control information for the network entity. The UE may identify whether the UE is permitted to access the network entity based on the access control information for the network entity. Accordingly, a UE may be able to identify whether the UE may camp on the network entity (e.g., whether the UE is authorized) without decoding a large SIB1. Further, a UE may be able to decode the system information (SI) without or with less blind decoding of the PDCCH.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system, sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a SIB component 198 that may be configured to receive an indication of a first assignment of a first PDSCH via a PBCH from a network entity. The first PDSCH may include at least a first portion of a SIB. The SIB component 198 may be configured to receive the first portion of the SIB via the first PDSCH from the network entity based on the first assignment of the first PDSCH. In certain aspects, the base station 102 may include a SIB component 199 that may be configured to transmit, for a UE, an indication of a first assignment of a first PDSCH via a PBCH. The first PDSCH may include at least a first portion of a SIB. The SIB component 199 may be configured to transmit, for the UE, the first portion of the SIB via the first PDSCH based on the first assignment of the first PDSCH.

In certain aspects, the UE 104 may include a SIB component 198 that may be configured to receive a first portion of a SIB from a network entity. The first portion of the SIB may include access control information for the network entity and may indicate an assignment of a second PDSCH if the access control information indicates that the UE is permitted to access the network entity. The SIB component 198 may be configured to identify whether the UE is permitted to access the network entity based on the access control information for the network entity. In certain aspects, the base station 102 may include a SIB component 199 that may be configured to transmit, for a UE, a first portion of a SIB. The first portion of the SIB may include access control information for the network entity. The UE may be or may not be permitted to access the network entity based on the access control information for the network entity. The SIB component 199 may be configured to transmit, for the UE, a second portion of the SIB via a second PDSCH based on a second assignment of the second PDSCH if the UE is permitted to access the network entity. The second assignment of the second PDSCH may be based on the first portion of the SIB if the UE is permitted to access the network entity. Although the following description may be focused on 5G NR, the concepts described herein may be applicable to other similar areas, such as LTE, LTE-A, CDMA, GSM, and other wireless technologies.

Figure 2:
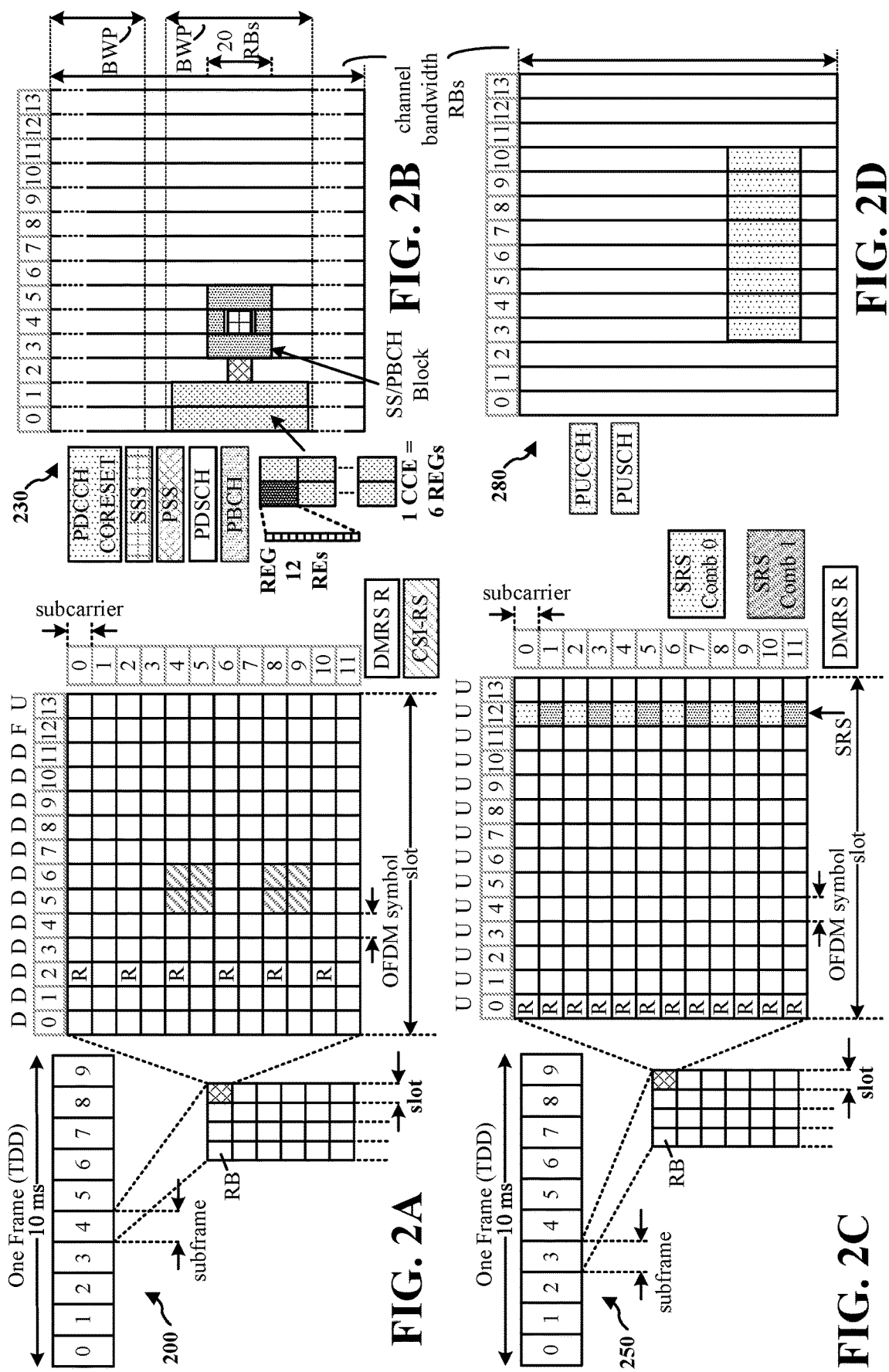
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies p 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and 2 slots/subframe. The subcarrier spacing may be equal to 2*15 kHz, where y is the numerology 0 to 4. As such, the numerology p=0 has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology p=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space (CSS), UE-specific search space (USS)) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
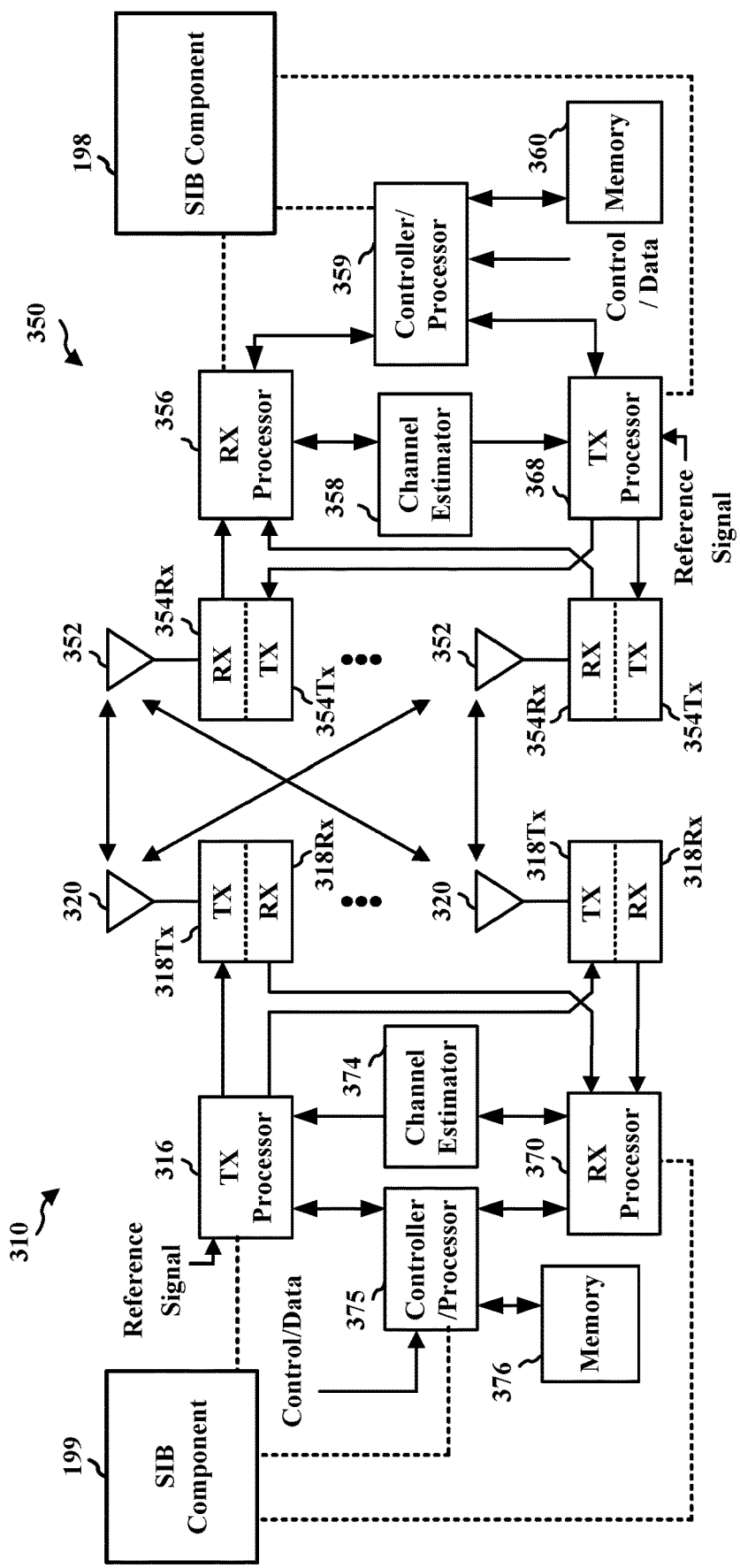
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SIB component 198 of FIG. 1.

At least one of the TX processor 316, the RX processor 370, and the controller/processor 375 may be configured to perform aspects in connection with the SIB component 199 of FIG. 1.

In some aspects, the SI may include a MIB and a number of SIBs. The SI may be divided into the MSI and the other SI (OSI). The MSI may include the basic information used for initial access and the information for acquiring any OSI. In one configuration, the MSI may include the MIB and the SIB 1. In particular, the MIB may contain network entity barred status information and essential physical layer information of the network entity used for the reception of further SI, e.g., the CORESET #0 configuration. In some configurations, the MIB may be periodically broadcast on the broadcast channel (BCH). Further, the SIB1 may define the scheduling of OSI blocks, and may contain information used for initial access. The SIB1 may also referred to as the remaining MSI (RMSI), and may be periodically broadcast on DL-shared channel (DL-SCH) or sent in a dedicated manner on the DL-SCH to UEs in the RRC_CONNECTED state. Moreover, the OSI may encompass all SIBs not broadcast in the MSI (e.g., SIB2 and beyond).

With the introduction of new UE features or types, the payload size of the SIB1 may keep increasing, and may soon reach the capacity limit of the SIB1. In some configurations, to acquire the SIB1, a UE may monitor the TypeO-CSS set, and may blind decode the scheduling PDCCH (e.g., the CORESET #0) of the SIB1. For a UE to identify whether the UE is authorized to access a network entity, the UE may decode a large TB (e.g., more than 300 bytes), even though the access/barring control information may occupy much less space.

Figure 4:
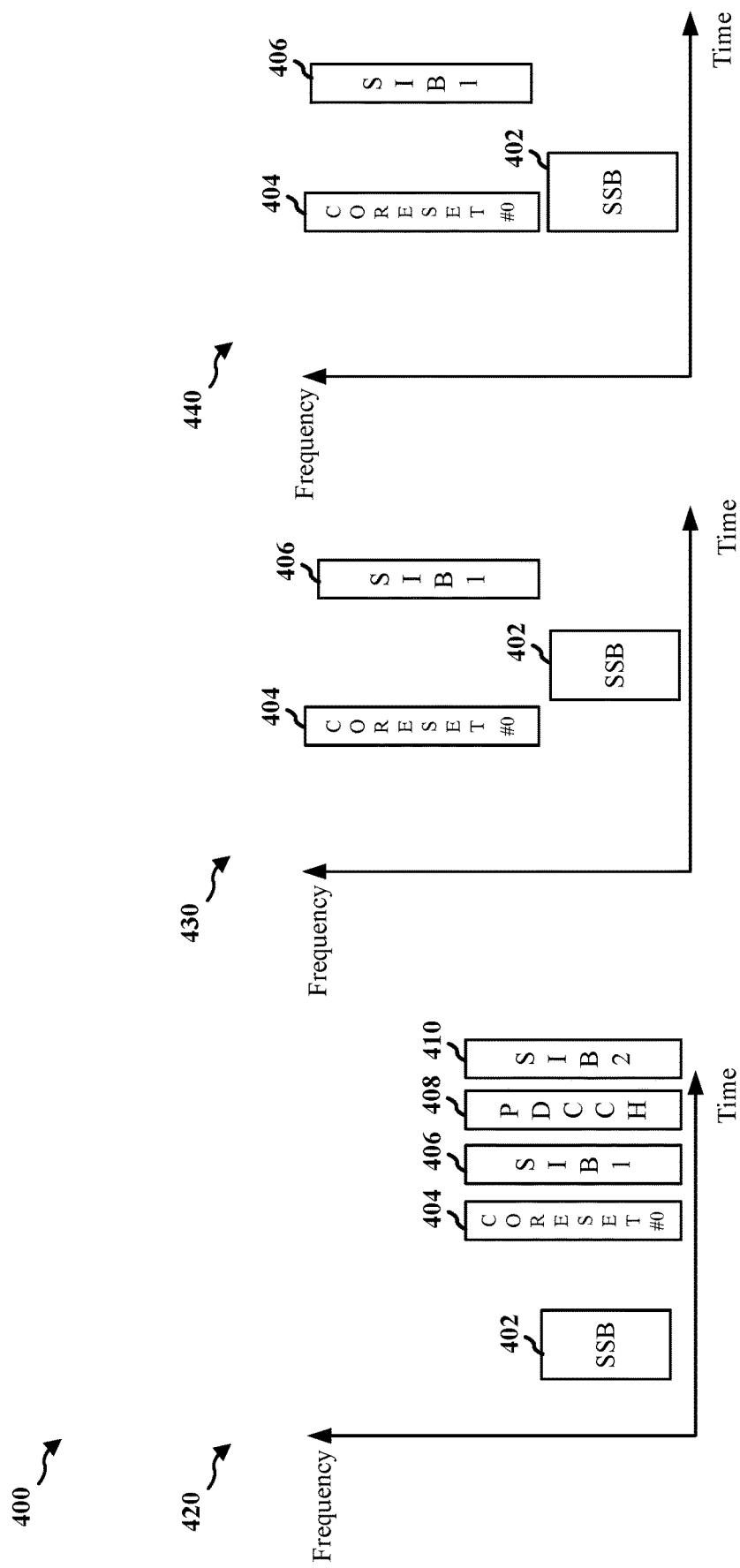
FIG. 4 is a diagram illustrating various example minimum system information (MSI) structures.

FIG. 4 is a diagram 400 illustrating various example MSI structures. As shown, the diagrams 420, 430, 440 may each illustrate an example time-frequency resource multiplexing pattern associated with the channels or blocks for the acquisition of the MSI. In general, a UE may blind decode a CORESET #0 404 based on an indication in the MIB received with the SSB 402 (which may be received via the PBCH). The CORESET #0 404 may include a DL assignment of a PDSCH that may carry the SIB1 406. As shown in the diagram 420, the SIB1 406 may include an indication of a further PDCCH 408, where the PDCCH 408 may include a DL assignment of a further PDSCH that may carry the SIB2 410. Therefore, to acquire the SIB1 406, blind decoding of the CORESET #0 404 may be performed by the UE first.

A scalable network (e.g., based on a future technology such as 6G and so on) may ensure the co-existence of UEs of different UE types, as well as UEs belonging to different access categories or access identities. The framework of unified access control (UAC) may be re-used or extended to enable the co-existence of the UEs. It may be up to the RAN to broadcast the barring control information associated with different access categories and/or access identities.

It may be desirable to improve the efficiency of MSI delivery or decoding. In particular, based on an improved approach according to one or more aspects, a UE may be able to identify whether the UE may camp on the network entity (e.g., whether the UE is authorized) without decoding a large SIB1. Further, a UE may be able to decode the SI without or with less blind decoding of the PDCCH.

In some configurations, the network may be backward-compatible. In particular, the access control information for legacy and new UE types may be indicated (e.g., explicitly) in a lightweight SIB.

One or more aspects may relate to improved structures of the MSI that may be carried in the PBCH and the SIB. Accordingly, the efficiency of SI scheduling may be improved (e.g., the overhead of always-on MSI may be reduced and energy may be saved as the network energy consumption associated with SI broadcasting may be reduced). Further, the complexity at the UE associated with the acquisition of the MSI may be reduced.

Figure 5:
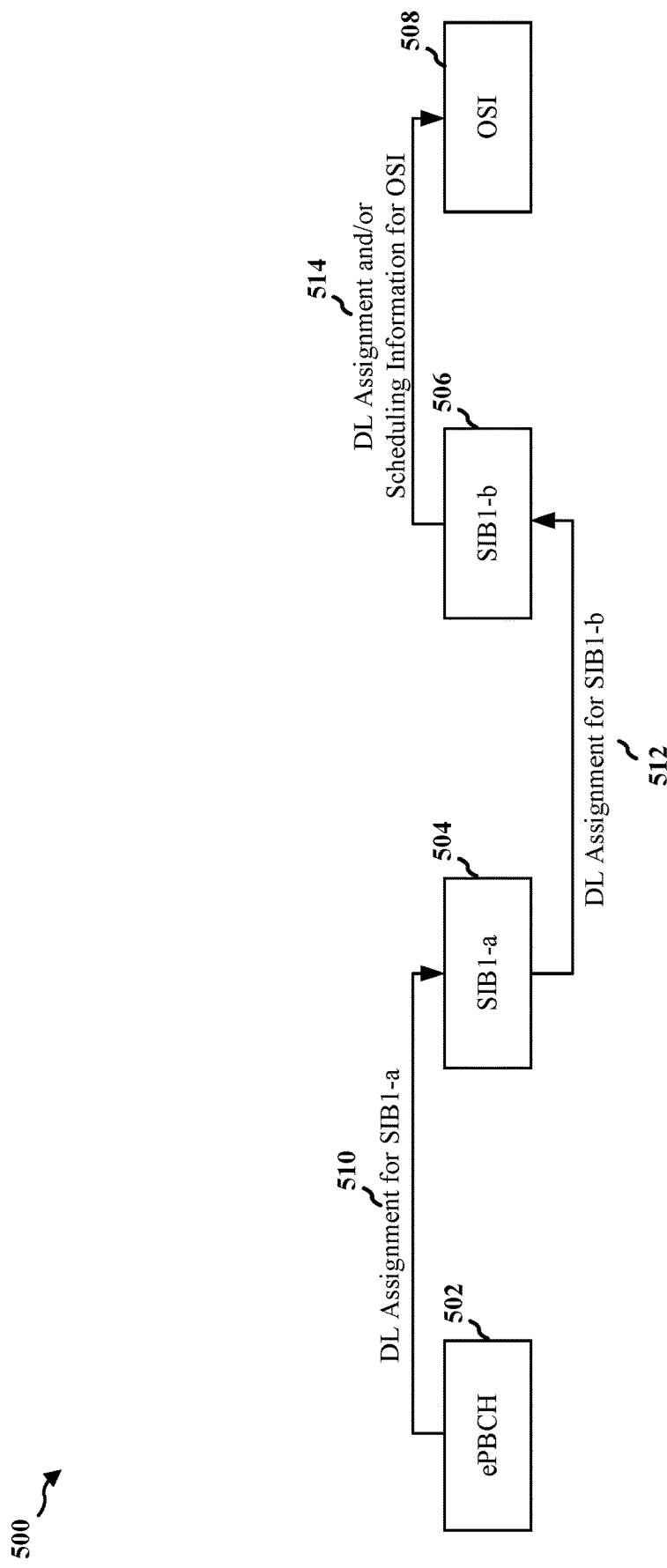
FIG. 5 is a diagram illustrating an MSI structure according to one or more aspects.

FIG. 5 is a diagram 500 illustrating an MSI structure according to one or more aspects. As shown, an enhanced PBCH (ePBCH) 502 may indicate a DL assignment 510 for a SIB1-a 504 (e.g., a first portion of a SIB1). The SIB1-a 504 may indicate a DL assignment 512 for a SIB1-b 506 (e.g., a second portion of the SIB1). The ePBCH 502, the SIB1-a 504, and the SIB1-b 506 may be described in further detail below. Moreover, the SIB1-b 506 may carry the DL assignment and/or the additional scheduling information 514 for the OSI 508.

In one or more configurations, an ePBCH may carry master system information (e.g., a MIB) of a serving network entity. In some configurations, the ePBCH may have a small payload size (e.g., 24 bits, 32 bits, 36 bits, 40 bits, 48 bits, etc.). In one configuration, the ePBCH payload size may be a constant. In another configuration, the ePBCH payload size may be configurable (e.g., within a specified/limited range).

Figure 6:
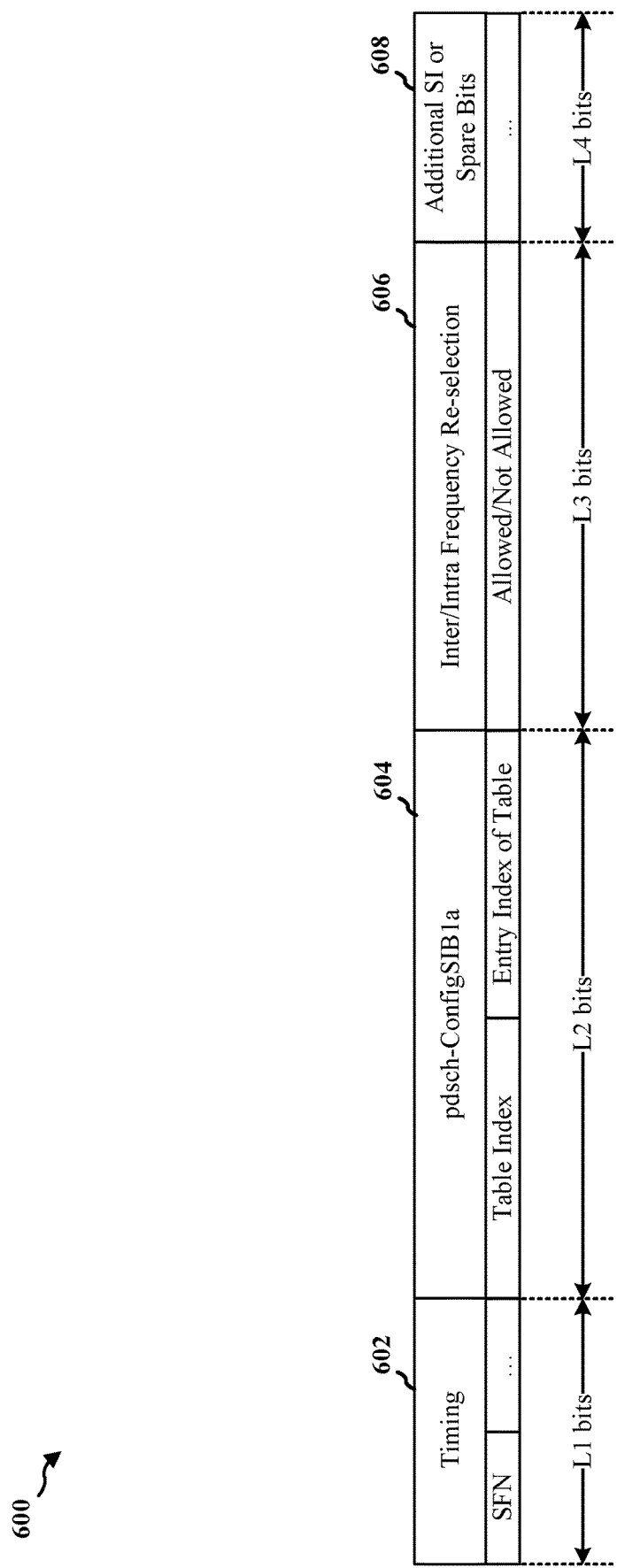
FIG. 6 is a diagram illustrating various fields in an example enhanced PBCH (ePBCH) according to one or more aspects.

FIG. 6 is a diagram illustrating various fields in an example ePBCH 600 according to one or more aspects. As shown, the example ePBCH 600 may include multiple fields for indicating various system information. For example, a first field 602 with a size of L1 bits may be used to indicate the timing (e.g., the SFN). A second field 604 with a size of L2 bits may be used to indicate a DL assignment for the SIB1-a (e.g., a "pdsch-ConfigSIB1a" field). Moreover, a third field 606 with a size of L3 bits may be used to indicate whether inter/intra-frequency re-selection is allowed/permitted. Further, a fourth field 608 with a size of L4 bits may be used to indicate additional SI or may include spare bits.

In one configuration, the indication of the DL assignment for the SIB1-a may include an index of the selected entry in a preconfigured lookup table, where each entry in the lookup table may correspond to a potential DL assignment for a SIB1-a. The DL assignment for the SIB1-a may correspond to a PDSCH. In one or more configurations, a DL assignment for a SIB1-a may include, for example, one or more of a time-frequency resource allocation, a spatial relationship indication, a waveform indication, a modulation and coding scheme (MCS) indication, a payload size indication (e.g., an actual TB size (TBS), a scaling factor, an aggregation factor, etc.), additional information for coverage enhancement of the SIB, and so on. In one configuration, multiple lookup tables may be preconfigured, and the indication of the DL assignment for the SIB1-a may also include an index of the selected lookup table in the multiple lookup tables.

In some configurations, the transmission of the SIB1-a may be configured with a low MCS and/or a low-peak-to-average power ratio (PAPR) waveform.

In one configuration, to acquire the SIB1-a, the UE may not blind decode any PDCCH first.

In some configurations, the message type of the ePBCH may be indicated (explicitly or implicitly) based on one of a DM-RS resource configuration, a cyclic redundancy check (CRC) attachment scheme, a radio resource mapping, or payload construction of the ePBCH. For example, the message type of the ePBCH may indicate that an ePBCH may not carry the DL assignment for the SIB1-a (e.g., a non-cell defining-enhanced SSB (NCD-eSSB)). In another example, the message type of the ePBCH may indicate that the DL assignment for the SIB1-a may depend on one or more of UE capabilities, duplex modes of the network (e.g., subband full duplex (SBFD)), or the network topology (e.g., smart repeaters, reconfigurable intelligent surface (RIS), etc.).

As described above, in some configurations, to acquire the SIB1-a, because the DL assignment for the SIB1-a may be provided in the ePBCH, the UE may not blind decode a PDCCH first.

In some configurations, the SIB1-a may be a lightweight (e.g., small payload size) SIB including essential SI for unified access control of UEs. In some configurations, the SIB1-a may indicate a DL assignment for a SIB1-b (e.g., a second portion of the SIB1).

In some configurations, the payload size of the SIB1-a may be configurable (e.g., within a specified/limited range).

Figure 7:
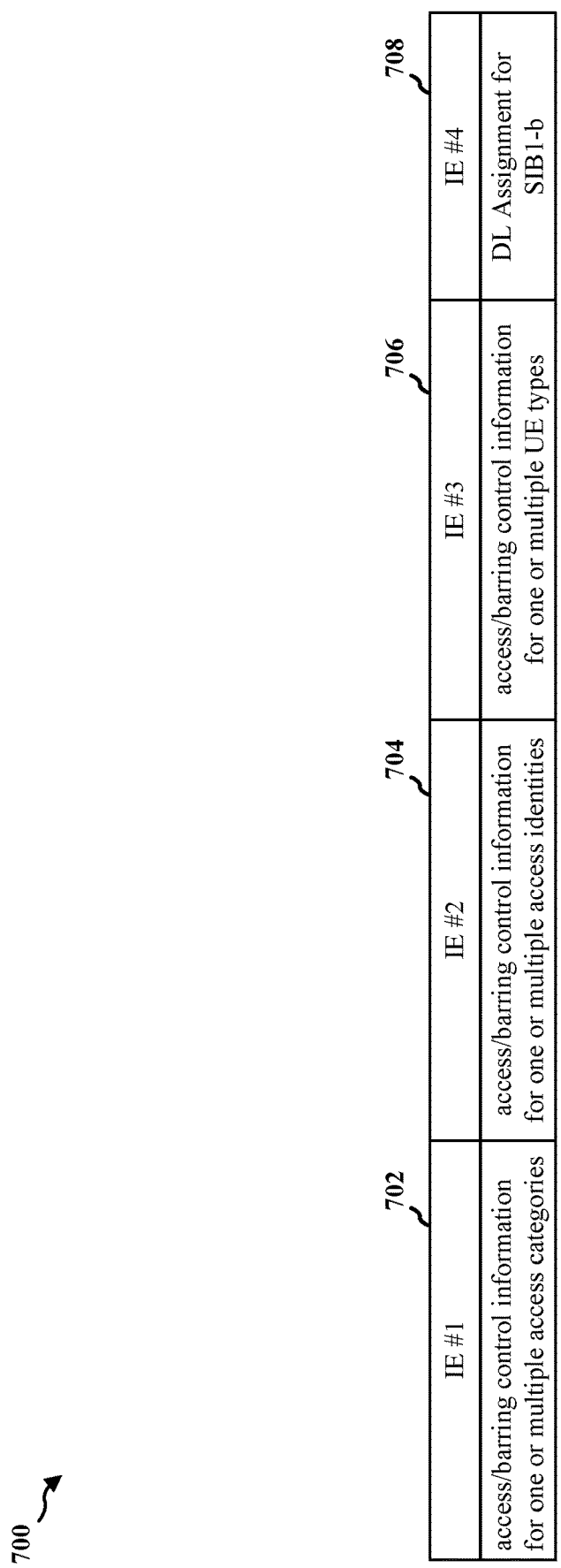
FIG. 7 is a diagram illustrating various fields of an example SIB1-a according to one or more aspects.

FIG. 7 is a diagram illustrating various fields of an example SIB1-a 700 according to one or more aspects. As shown, the example SIB1-a 700 may include a first field 702 (i.e., the "information element (IE) #1" field) that may be used to indicate the access/barring control information for one or more access categories (an access category may relate to conditions related to a UE and a type of access attempt). The example SIB1-a 700 may include a second field 704 (i.e., the "IE #2" field) that may be used to indicate the access/barring control information for one or more access identities (an access identity may relate to a UE configuration for, e.g., a multimedia priority service (MPS), a mission critical service, a disaster condition, or an access class, etc.). Moreover, the example SIB1-a 700 may include a third field 706 (i.e., the "IE #3" field) that may be used to indicate the access/barring control information for one or more UE types.

In one configuration, the example SIB1-a 700 may include a fourth field 708 (i.e., the "IE #4" field) that may be used to indicate the DL assignment for the SIB1-b. In particular, in one configuration, the indication of the DL assignment for the SIB1-b may include an index of the selected entry in a preconfigured lookup table, where each entry in the lookup table may correspond to a potential DL assignment for a SIB1-b. The DL assignment for the SIB1-b may correspond to a PDSCH. In one or more configurations, a DL assignment for a SIB1-b may include, for example, one or more of a time-frequency resource allocation, a spatial relationship indication, a waveform indication, an MCS indication, a payload size indication (e.g., an actual TBS, a scaling factor, an aggregation factor, etc.), additional information for coverage enhancement of the SIB, and so on. In one configuration, multiple lookup tables may be preconfigured, and the indication of the DL assignment for the SIB1-b may also include an index of the selected lookup table in the multiple lookup tables.

In one configuration, the one or more lookup tables associated with the DL assignment for the SIB1-a and the one or more lookup tables associated with the DL assignment for the SIB1-b may be the same one or more lookup tables. In another configuration, the one or more lookup tables associated with the DL assignment for the SIB1-a and the one or more lookup tables associated with the DL assignment for the SIB1-b may be different lookup tables.

In one configuration, if a UE is not barred from the network entity (e.g., based on the access/barring control information in the SIB1-a), the UE may proceed with the SIB1-b decoding.

In one configuration, if a UE is barred from the network entity (e.g., based on the access/barring control information in the SIB1-a), the UE may abort the SIB1-b decoding. In one configuration, after or concurrently with the aborting of the SIB1-b decoding, the UE may proceed with a network entity selection/re-selection operation based on the indication in the ePBCH.

In some configurations, to acquire the SIB1-b, because the DL assignment for the SIB1-b is provided in the SIB1-a, the UE may not blind decode a PDCCH.

For UEs allowed to access the network entity (e.g., as indicated in the SIB1-a), in one configuration, the random access resource allocation (e.g., PRACH preambles, CSS sets for random access, PUCCH resource sets for HARQ-ACK to contention resolution messages) may be indicated and broadcast in the SIB1-b. In another configuration, a UE allowed to access the network entity may request the random access resource allocation from the network entity (e.g., based on beacons as indicated in the SIB1-b, where the beacons may be signals dedicated to the on-demand random access resource allocation process). The process of requesting and granting the random access resource allocation may be referred to as the on-demand allocation of random access resources.

Accordingly, in one configuration, if a UE of a particular UE type or access identity is allowed to access the network entity (e.g., as indicated in the SIB1-a) but is not provided with the resource allocation for initial access, the UE may transmit a beacon to the network entity to request on-demand allocation of random access resources. The beacon may be associated with an identifier (ID).

In one configuration, the beacons may re-use the waveform of PRACH preambles. In another configuration, the beacons may be configured with waveforms/bandwidths/radio resources different from those of the PRACH preambles.

In one or more configurations, after the request for on-demand random access resource allocation is transmitted by a UE using the beacon, the network entity (e.g., the network) may respond to the UE (e.g., within a time window). In one configuration, the response from the network entity may include the ID of the beacon (e.g., as indicated in the beacon transmitted by the UE) and an indication of the random access resources allocated to the UE. In one configuration, the response from the network entity may not include timing advanced (TA) information or contention resolution information. In other words, the response from the network entity may be different from a random access response in a 2-step or 4-step random access channel (RACH) process.

In one or more configurations, the on-demand allocation of random access resources may be network entity-specific or beam-specific. In further configurations, the on-demand allocation of random access resources may be adaptive to (based on) the system loading (e.g., across different beams), coverage of the network entity, random access priority, UE types, access categories, and/or access identities. In other words, the on-demand allocation of random access resources may be associated with one or more of a network entity, a beam, a system loading, a random access priority, a UE type, an access category, or an access identity.

Figure 8:
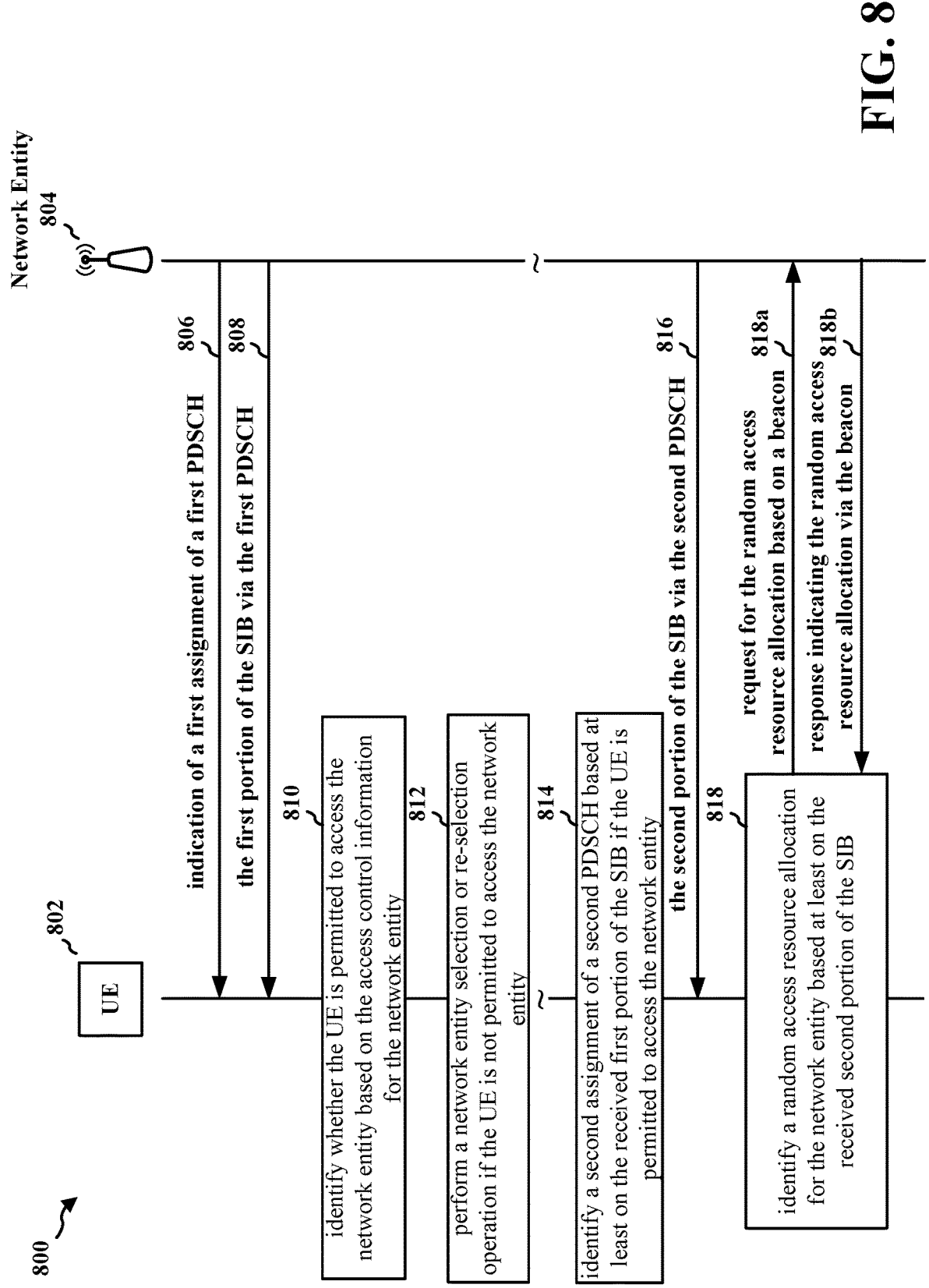
FIG. 8 is a diagram of a communication flow of a method of wireless communication.

FIG. 8 is a diagram of a communication flow 800 of a method of wireless communication. The UE 802 may implement aspects of the UE 104/350. Further, the network entity 804 may implement aspects of the base station 102/310. At 806, the network entity 804 may transmit, for a UE 802, an indication of a first assignment of a first PDSCH via a PBCH (e.g., an ePBCH). The first PDSCH may include at least a first portion of a SIB (e.g., a SIB1-a).

In one configuration, the network entity 804 may provide an indication of a message type of the PBCH to the UE 802.

In one configuration, the indication of the first assignment of the first PDSCH may be associated with a first lookup table. The indication of the first assignment of the first PDSCH may include an index of an entry for the first assignment in the first lookup table.

In one configuration, the first assignment of the first PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

At 808, the network entity 804 may transmit, for the UE 802, the first portion of the SIB via the first PDSCH based on the first assignment of the first PDSCH. The first portion of the SIB may include access control information for the network entity 804.

In one or more configurations, the access control information for the network entity 804 may include access/barring control information for one or more access categories, one or more access identities, and/or one or more UE types.

At 810, the UE 802 may identify whether the UE 802 is permitted to access the network entity 804 based on the access control information for the network entity 804.

In one configuration, at 812, the UE 802 may perform a network entity selection or re-selection operation if the UE 802 is not permitted to access the network entity 804.

In another configuration, at 814, the UE 802 may identify a second assignment of a second PDSCH based at least on the received first portion of the SIB if the UE 802 is permitted to access the network entity 804. The second PDSCH may include a second portion of the SIB (e.g., a SIB1-b).

In one configuration, the second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

In one configuration, the first portion of the SIB may include an indication of the second assignment of the second PDSCH. The indication of the second assignment may be associated with a second lookup table. The indication of the second assignment may include an index of an entry for the second assignment in the second lookup table.

At 816, the network entity 804 may transmit, for the UE 802, a second portion of the SIB via the second PDSCH based on the second assignment of the second PDSCH if the UE 802 is permitted to access the network entity 804.

In one configuration, the second portion of the SIB may include at least an indication of the random access resource allocation for the network entity 804 and for the UE 802 or an indication of an assignment for a subsequent SIB transmission from the network entity 804.

At 818, the UE 802 may identify a random access resource allocation for the network entity 804 based at least on the received second portion of the SIB.

In one configuration, the second portion of the SIB may include information associated with on-demand random access resource allocation. At 818a, the UE 802 may transmit, for the network entity 804, a request for the random access resource allocation based on a beacon and the information associated with the on-demand random access resource allocation.

At 818b, the network entity 804 may transmit, for the UE 802, a response indicating the random access resource allocation for the network entity 804 and for the UE 802 based on the received request for the random access resource allocation.

In one configuration, the on-demand allocation of random access resources may be associated with one or more of a network entity, a beam, a system loading, a random access priority, a UE type, an access category, or an access identity.

Figure 9:
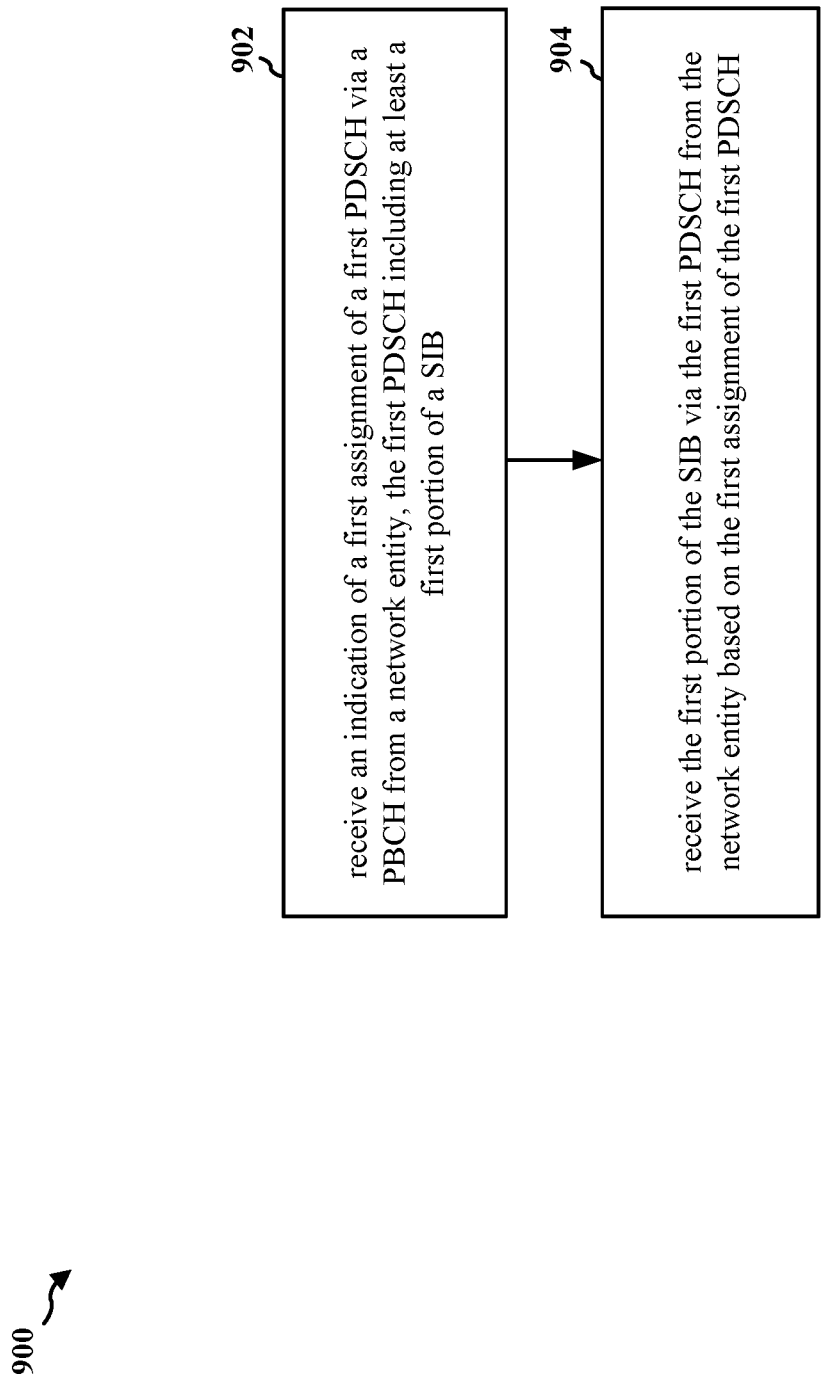
FIG. 9 is a flowchart of a method of wireless communication.

FIG. 9 is a flowchart 900 of a method of wireless communication. The method may be performed by a UE (e.g., the UE 104/350/802; the apparatus 1704). At 902, the UE may receive an indication of a first assignment of a first PDSCH via a PBCH from a network entity. The first PDSCH may include at least a first portion of a SIB. For example, 902 may be performed by the component 198 in FIG. 17. Referring to FIG. 8, at 806, the UE 802 may receive an indication of a first assignment of a first PDSCH via a PBCH from a network entity 804.

At 904, the UE may receive the first portion of the SIB via the first PDSCH from the network entity based on the first assignment of the first PDSCH. For example, 904 may be performed by the component 198 in FIG. 17. Referring to FIG. 8, at 808, the UE 802 may receive the first portion of the SIB via the first PDSCH from the network entity 804 based on the first assignment of the first PDSCH.

Figure 10:
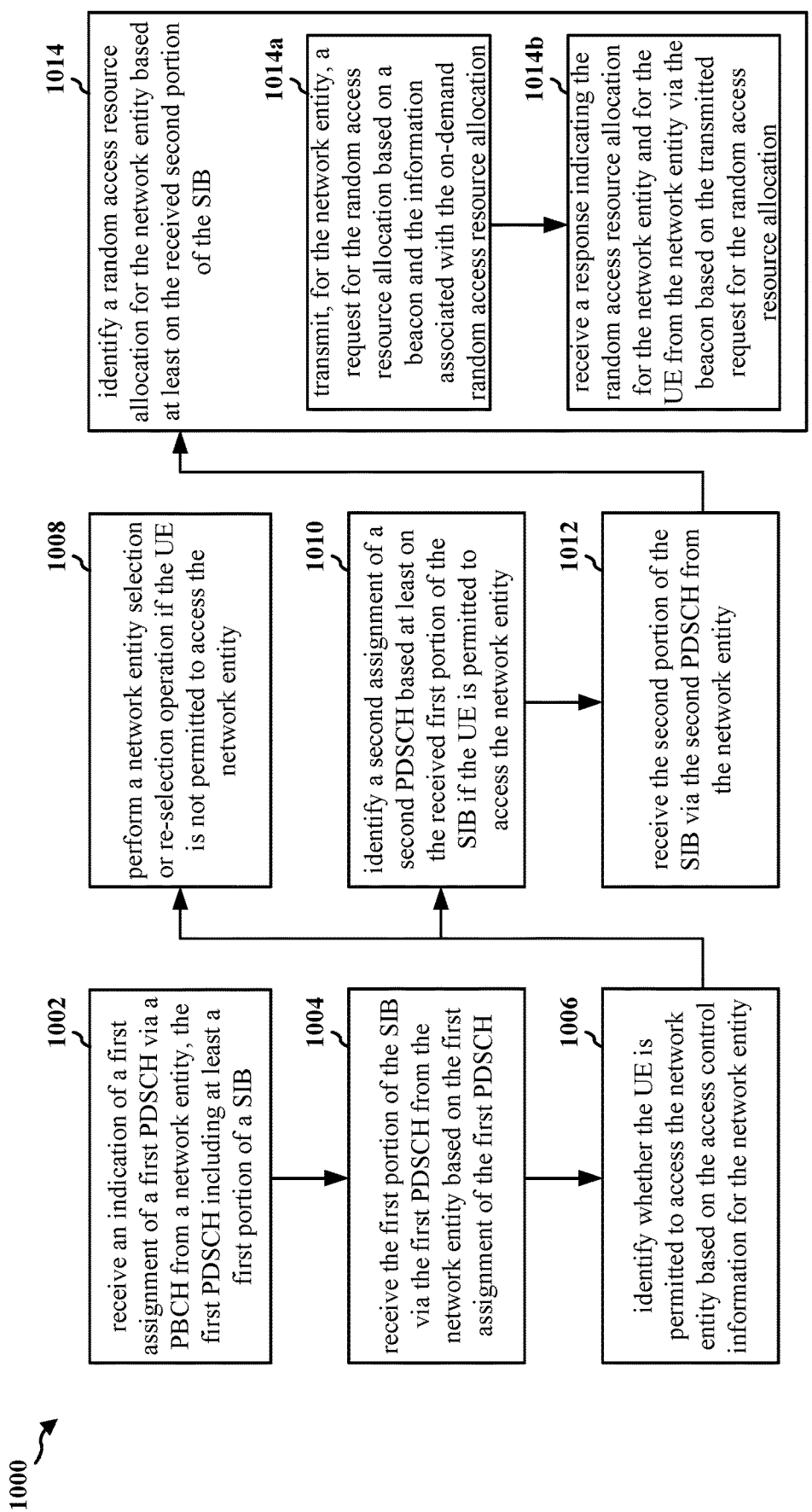
FIG. 10 is a flowchart of a method of wireless communication.

FIG. 10 is a flowchart 1000 of a method of wireless communication. The method may be performed by a UE (e.g., the UE 104/350/802; the apparatus 1704). At 1002, the UE may receive an indication of a first assignment of a first PDSCH via a PBCH from a network entity. The first PDSCH may include at least a first portion of a SIB. For example, 1002 may be performed by the component 198 in FIG. 17. Referring to FIG. 8, at 806, the UE 802 may receive an indication of a first assignment of a first PDSCH via a PBCH from a network entity 804.

At 1004, the UE may receive the first portion of the SIB via the first PDSCH from the network entity based on the first assignment of the first PDSCH. For example, 1004 may be performed by the component 198 in FIG. 17. Referring to FIG. 8, at 808, the UE 802 may receive the first portion of the SIB via the first PDSCH from the network entity 804 based on the first assignment of the first PDSCH.

In one configuration, referring to FIG. 8, the indication of the first assignment of the first PDSCH, at 806, may be associated with a first lookup table. The indication of the first assignment of the first PDSCH, at 806, may include an index of an entry for the first assignment in the first lookup table.

In one configuration, the first assignment of the first PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

In one configuration, referring to FIG. 8, the first portion of the SIB may include access control information for the network entity 804. At 1006, the UE may identify whether the UE is permitted to access the network entity based on the access control information for the network entity. For example, 1006 may be performed by the component 198 in FIG. 17. Referring to FIG. 8, at 810, the UE 802 may identify whether the UE 802 is permitted to access the network entity 804 based on the access control information for the network entity 804.

In one configuration, at 1008, the UE may perform a network entity selection or re-selection operation if the UE is not permitted to access the network entity. For example, 1008 may be performed by the component 198 in FIG. 17. Referring to FIG. 8, at 812, the UE 802 may perform a network entity selection or re-selection operation if the UE 802 is not permitted to access the network entity 804.

In one configuration, at 1010, the UE may identify a second assignment of a second PDSCH based at least on the received first portion of the SIB if the UE is permitted to access the network entity. The second PDSCH may include a second portion of the SIB. For example, 1010 may be performed by the component 198 in FIG. 17. Referring to FIG. 8, at 814, the UE 802 may identify a second assignment of a second PDSCH based at least on the received first portion of the SIB if the UE 802 is permitted to access the network entity 804.

At 1012, the UE may receive the second portion of the SIB via the second PDSCH from the network entity. For example, 1012 may be performed by the component 198 in FIG. 17. Referring to FIG. 8, at 816, the UE 802 may receive the second portion of the SIB via the second PDSCH from the network entity 804.

At 1014, the UE may identify a random access resource allocation for the network entity based at least on the received second portion of the SIB. For example, 1014 may be performed by the component 198 in FIG. 17. Referring to FIG. 8, at 818, the UE 802 may identify a random access resource allocation for the network entity 804 based at least on the received second portion of the SIB.

In one configuration, referring to FIG. 8, the second portion of the SIB, at 816, may include at least an indication of the random access resource allocation for the network entity 804 and for the UE 802 and/or an indication of an assignment for a subsequent SIB transmission from the network entity 804.

In one configuration, referring to FIG. 8, the second portion of the SIB, at 816, may include information associated with on-demand random access resource allocation. To identify the random access resource allocation for the network entity, at 1014a, the UE may transmit, for the network entity, a request for the random access resource allocation based on a beacon and the information associated with the on-demand random access resource allocation. For example, 1014a may be performed by the component 198 in FIG. 17. Referring to FIG. 8, at 818a, the UE 802 may transmit, for the network entity 804, a request for the random access resource allocation based on a beacon and the information associated with the on-demand random access resource allocation.

At 1014b, the UE may receive a response indicating the random access resource allocation for the network entity and for the UE from the network entity based on the transmitted request for the random access resource allocation. For example, 1014b may be performed by the component 198 in FIG. 17. Referring to FIG. 8, at 818b, the UE 802 may receive a response indicating the random access resource allocation for the network entity 804 and for the UE 802 from the network entity 804 based on the transmitted request for the random access resource allocation.

In one configuration, referring to FIG. 8, the first portion of the SIB, at 808, may include an indication of the second assignment of the second PDSCH. The indication of the second assignment may be associated with a second lookup table. The indication of the second assignment may include an index of an entry for the second assignment in the second lookup table. In one configuration, the second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

Figure 11:
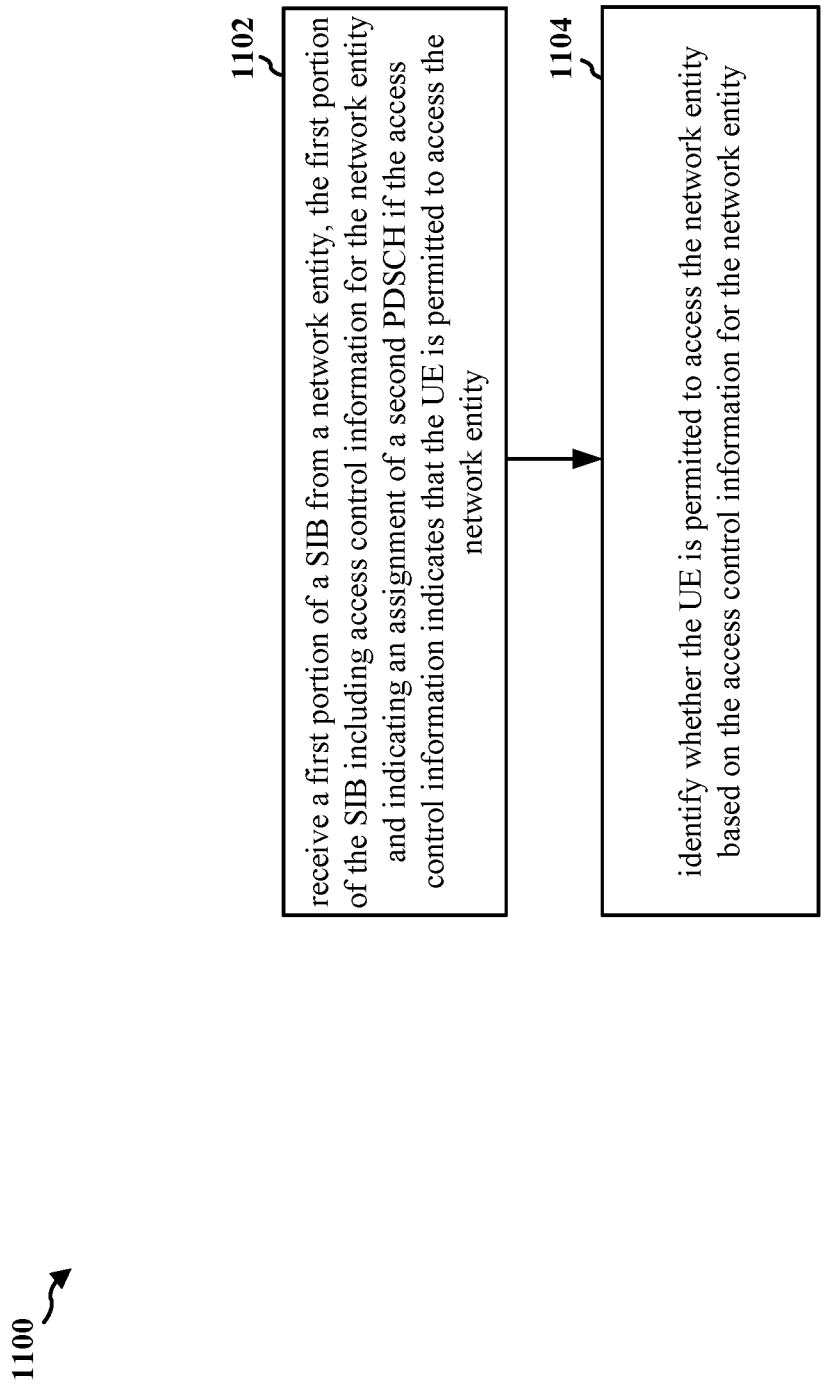
FIG. 11 is a flowchart of a method of wireless communication.

FIG. 11 is a flowchart 1100 of a method of wireless communication. The method may be performed by a UE (e.g., the UE 104/350/802; the apparatus 1704). At 1102, the UE may receive a first portion of a SIB from a network entity. The first portion of the SIB may include access control information for the network entity and may indicate an assignment of a second PDSCH if the access control information indicates that the UE is permitted to access the network entity. For example, 1102 may be performed by the component 198 in FIG. 17. Referring to FIG. 8, at 808, the UE 802 may receive a first portion of a SIB from a network entity 804.

At 1104, the UE may identify whether the UE is permitted to access the network entity based on the access control information for the network entity. For example, 1104 may be performed by the component 198 in FIG. 17. Referring to FIG. 8, at 810, the UE 802 may identify whether the UE 802 is permitted to access the network entity 804 based on the access control information for the network entity 804.

Figure 12:
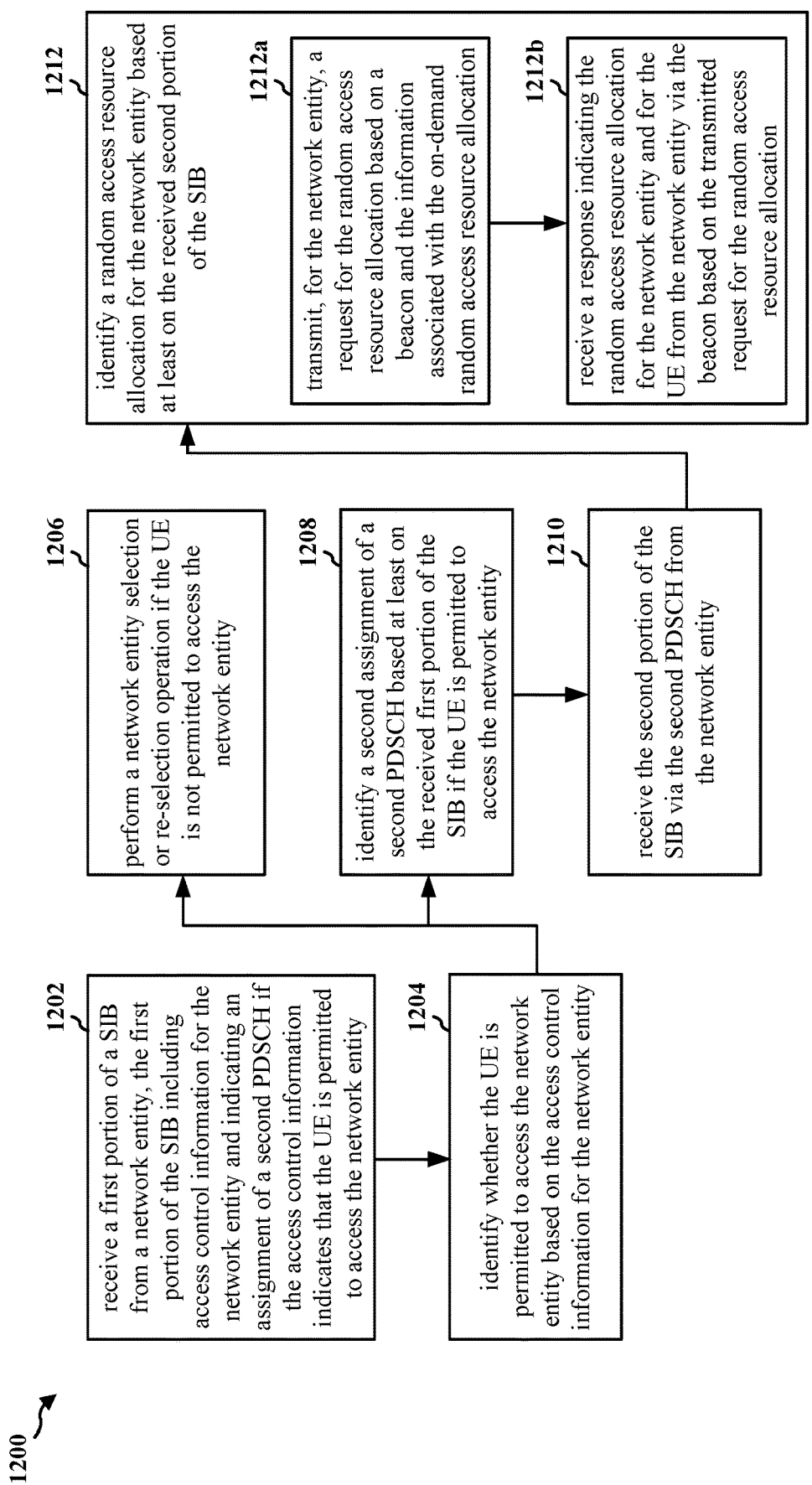
FIG. 12 is a flowchart of a method of wireless communication.

FIG. 12 is a flowchart 1200 of a method of wireless communication. The method may be performed by a UE (e.g., the UE 104/350/802; the apparatus 1704). At 1202, the UE may receive a first portion of a SIB from a network entity. The first portion of the SIB may include access control information for the network entity and may indicate an assignment of a second PDSCH if the access control information indicates that the UE is permitted to access the network entity. For example, 1202 may be performed by the component 198 in FIG. 17. Referring to FIG. 8, at 808, the UE 802 may receive a first portion of a SIB from a network entity 804.

At 1204, the UE may identify whether the UE is permitted to access the network entity based on the access control information for the network entity. For example, 1204 may be performed by the component 198 in FIG. 17. Referring to FIG. 8, at 810, the UE 802 may identify whether the UE 802 is permitted to access the network entity 804 based on the access control information for the network entity 804.

In one configuration, at 1206, the UE may perform a network entity selection or re-selection operation if the UE is not permitted to access the network entity. For example, 1206 may be performed by the component 198 in FIG. 17. Referring to FIG. 8, at 812, the UE 802 may perform a network entity selection or re-selection operation if the UE 802 is not permitted to access the network entity 804.

In one configuration, at 1208, the UE may identify a second assignment of a second PDSCH based at least on the received first portion of the SIB if the UE is permitted to access the network entity. The second PDSCH may include a second portion of the SIB. For example, 1208 may be performed by the component 198 in FIG. 17. Referring to FIG. 8, at 814, the UE 802 may identify a second assignment of a second PDSCH based at least on the received first portion of the SIB if the UE 802 is permitted to access the network entity 804.

At 1210, the UE may receive the second portion of the SIB via the second PDSCH from the network entity. For example, 1210 may be performed by the component 198 in FIG. 17. Referring to FIG. 8, at 816, the UE 802 may receive the second portion of the SIB via the second PDSCH from the network entity 804.

At 1212, the UE may identify a random access resource allocation for the network entity based at least on the received second portion of the SIB. For example, 1212 may be performed by the component 198 in FIG. 17. Referring to FIG. 8, at 818, the UE 802 may identify a random access resource allocation for the network entity 804 based at least on the received second portion of the SIB.

In one configuration, referring to FIG. 8, the second portion of the SIB, at 816, may include at least an indication of the random access resource allocation for the network entity 804 and for the UE 802 and/or an indication of an assignment for a subsequent SIB transmission from the network entity 804.

In one configuration, referring to FIG. 8, the second portion of the SIB, at 816, may include information associated with on-demand random access resource allocation. To identify the random access resource allocation for the network entity, at 1212a, the UE may transmit, for the network entity, a request for the random access resource allocation based on a beacon and the information associated with the on-demand random access resource allocation. For example, 1212a may be performed by the component 198 in FIG. 17. Referring to FIG. 8, at 818a, the UE 802 may transmit, for the network entity 804, a request for the random access resource allocation based on a beacon and the information associated with the on-demand random access resource allocation.

At 1212b, the UE may receive a response indicating the random access resource allocation for the network entity and for the UE from the network entity based on the transmitted request for the random access resource allocation. For example, 1212b may be performed by the component 198 in FIG. 17. Referring to FIG. 8, at 818b, the UE 802 may receive a response indicating the random access resource allocation for the network entity 804 and for the UE 802 from the network entity 804 based on the transmitted request for the random access resource allocation.

In one configuration, referring to FIG. 8, the first portion of the SIB, at 808, may include an indication of the second assignment of the second PDSCH. The indication of the second assignment may be associated with a second lookup table. The indication of the second assignment may include an index of an entry for the second assignment in the second lookup table. In one configuration, the second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

Figure 13:
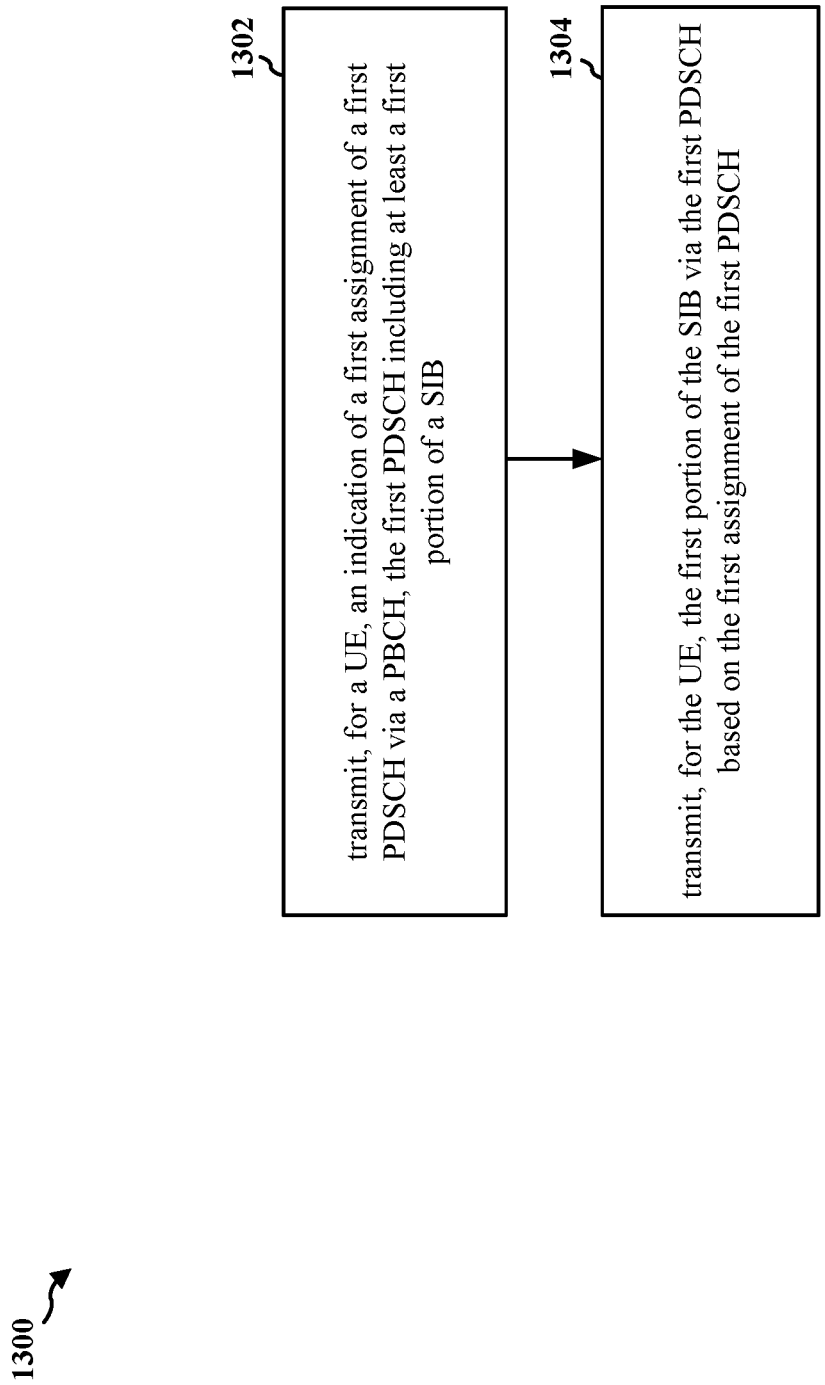
FIG. 13 is a flowchart of a method of wireless communication.

FIG. 13 is a flowchart 1300 of a method of wireless communication. The method may be performed by a network entity (e.g., the base station 102/310; the network entity 804/1702/1802). At 1302, the network entity may transmit, for a UE, an indication of a first assignment of a first PDSCH via a PBCH. The first PDSCH may include at least a first portion of a SIB. For example, 1302 may be performed by the component 199 in FIG. 18. Referring to FIG. 8, at 806, the network entity 804 may transmit, for a UE 802, an indication of a first assignment of a first PDSCH via a PBCH.

At 1304, the network entity may transmit, for the UE, the first portion of the SIB via the first PDSCH based on the first assignment of the first PDSCH. For example, 1304 may be performed by the component 199 in FIG. 18. Referring to FIG. 8, at 808, the network entity 804 may transmit, for the UE 802, the first portion of the SIB via the first PDSCH based on the first assignment of the first PDSCH.

Figure 14:
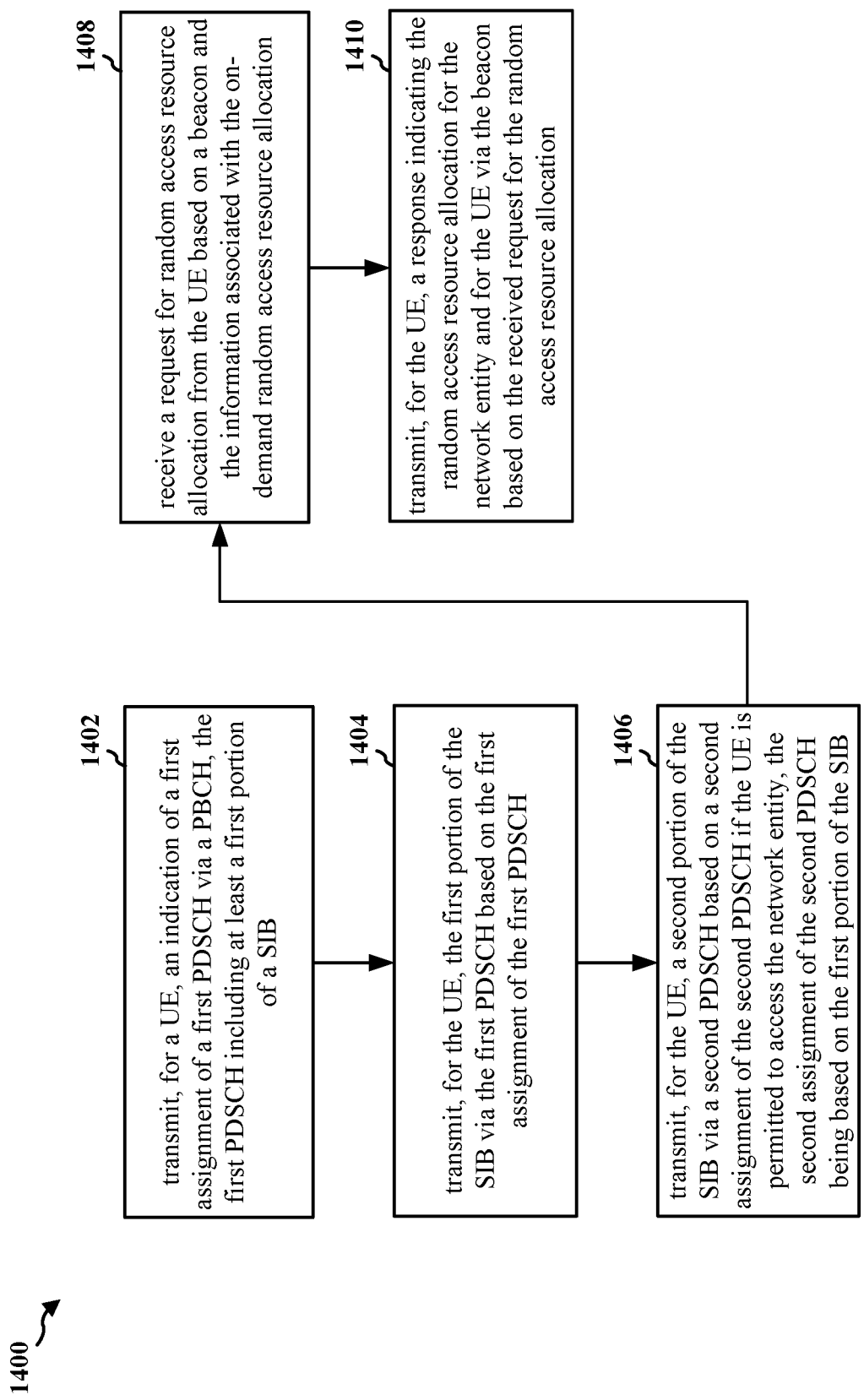
FIG. 14 is a flowchart of a method of wireless communication.

FIG. 14 is a flowchart 1400 of a method of wireless communication. The method may be performed by a network entity (e.g., the base station 102/310; the network entity 804/1702/1802). At 1402, the network entity may transmit, for a UE, an indication of a first assignment of a first PDSCH via a PBCH. The first PDSCH may include at least a first portion of a SIB. For example, 1402 may be performed by the component 199 in FIG. 18. Referring to FIG. 8, at 806, the network entity 804 may transmit, for a UE 802, an indication of a first assignment of a first PDSCH via a PBCH.

At 1404, the network entity may transmit, for the UE, the first portion of the SIB via the first PDSCH based on the first assignment of the first PDSCH. For example, 1404 may be performed by the component 199 in FIG. 18. Referring to FIG. 8, at 808, the network entity 804 may transmit, for the UE 802, the first portion of the SIB via the first PDSCH based on the first assignment of the first PDSCH.

In one configuration, referring to FIG. 8, the indication of the first assignment of the first PDSCH, at 806, may be associated with a first lookup table. The indication of the first assignment of the first PDSCH may include an index of an entry for the first assignment in the first lookup table.

In one configuration, the first assignment of the first PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

In one configuration, referring to FIG. 8, the first portion of the SIB, at 808, may include access control information for the network entity 804. The UE 802 may be or may not be permitted to access the network entity 804 based on the access control information for the network entity 804.

In one configuration, at 1406, the network entity may transmit, for the UE, a second portion of the SIB via a second PDSCH based on a second assignment of the second PDSCH if the UE is permitted to access the network entity. The second assignment of the second PDSCH may be based on the first portion of the SIB. For example, 1406 may be performed by the component 199 in FIG. 18. Referring to FIG. 8, at 816, the network entity 804 may transmit, for the UE 802, a second portion of the SIB via a second PDSCH based on a second assignment of the second PDSCH if the UE 802 is permitted to access the network entity 804.

In one configuration, referring to FIG. 8, the second portion of the SIB, at 816, may include at least an indication of random access resource allocation for the network entity 804 and for the UE 802 and/or an indication of an assignment for a subsequent SIB transmission from the network entity 804.

In one configuration, referring to FIG. 8, the second portion of the SIB, at 816, may include information associated with on-demand random access resource allocation. At 1408, the network entity may receive a request for random access resource allocation from the UE based on a beacon and the information associated with the on-demand random access resource allocation. For example, 1408 may be performed by the component 199 in FIG. 18. Referring to FIG. 8, at 818a, the network entity 804 may receive a request for random access resource allocation from the UE 802 based on a beacon and the information associated with the on-demand random access resource allocation.

At 1410, the network entity may transmit, for the UE, a response indicating the random access resource allocation for the network entity and for the UE based on the received request for the random access resource allocation. For example, 1410 may be performed by the component 199 in FIG. 18. Referring to FIG. 8, at 818b, the network entity 804 may transmit, for the UE 802, a response indicating the random access resource allocation for the network entity 804 and for the UE 802 based on the received request for the random access resource allocation.

In one configuration, referring to FIG. 8, the first portion of the SIB, at 808, may include an indication of the second assignment of the second PDSCH. The indication of the second assignment may be associated with a second lookup table. The indication of the second assignment may include an index of an entry for the second assignment in the second lookup table. In one configuration, the second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

Figure 15:
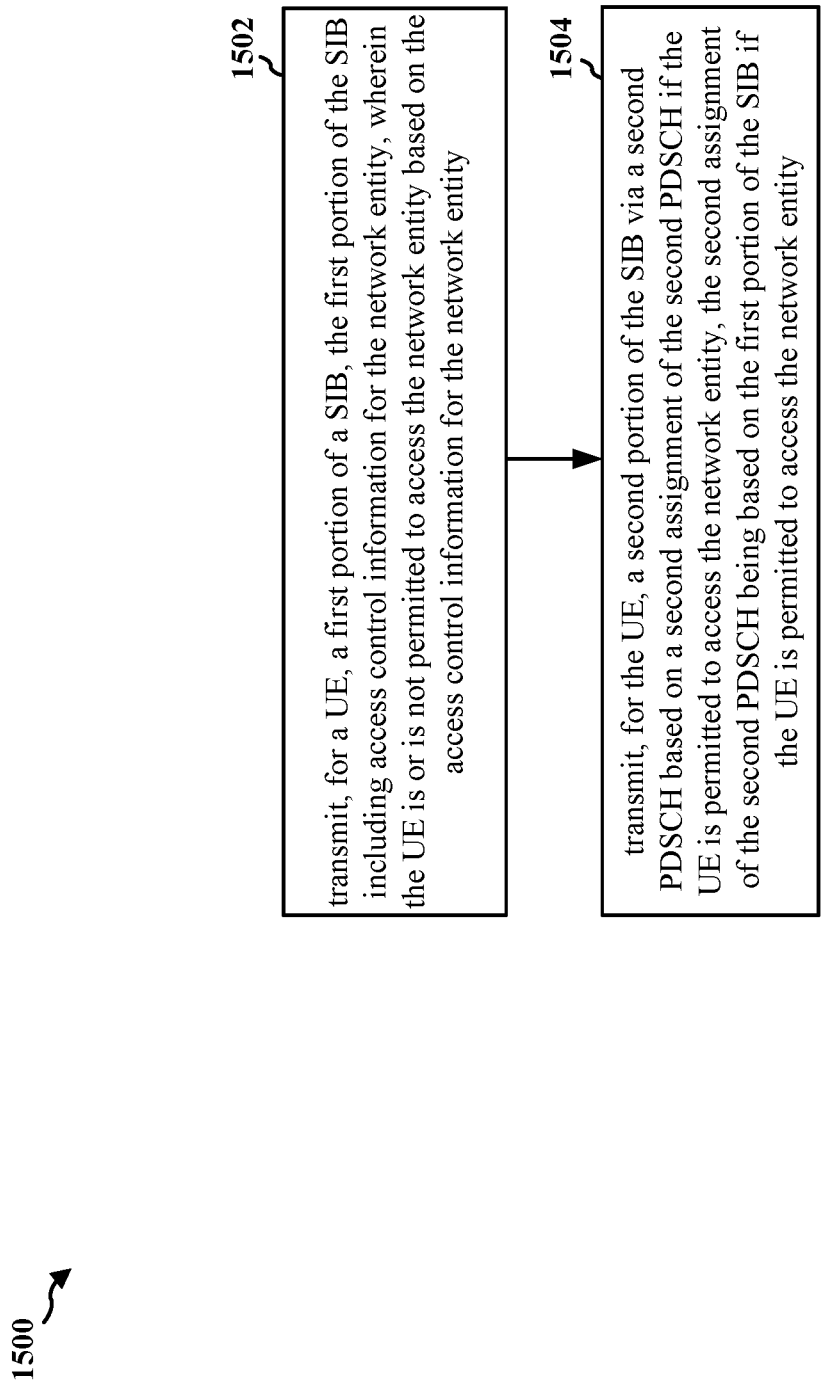
FIG. 15 is a flowchart of a method of wireless communication.

FIG. 15 is a flowchart 1500 of a method of wireless communication. The method may be performed by a network entity (e.g., the base station 102/310; the network entity 804/1702/1802). At 1502, the network entity may transmit, for a UE, a first portion of a SIB. The first portion of the SIB may include access control information for the network entity. The UE may be or may not be permitted to access the network entity based on the access control information for the network entity. For example, 1502 may be performed by the component 199 in FIG. 18. Referring to FIG. 8, at 808, the network entity 804 may transmit, for a UE 802, a first portion of a SIB.

At 1504, the network entity may transmit, for the UE, a second portion of the SIB via a second PDSCH based on a second assignment of the second PDSCH if the UE is permitted to access the network entity. The second assignment of the second PDSCH may be based on the first portion of the SIB if the UE is permitted to access the network entity. For example, 1504 may be performed by the component 199 in FIG. 18. Referring to FIG. 8, at 816, the network entity 804 may transmit, for the UE 802, a second portion of the SIB via a second PDSCH based on a second assignment of the second PDSCH if the UE 802 is permitted to access the network entity 804.

Figure 16:
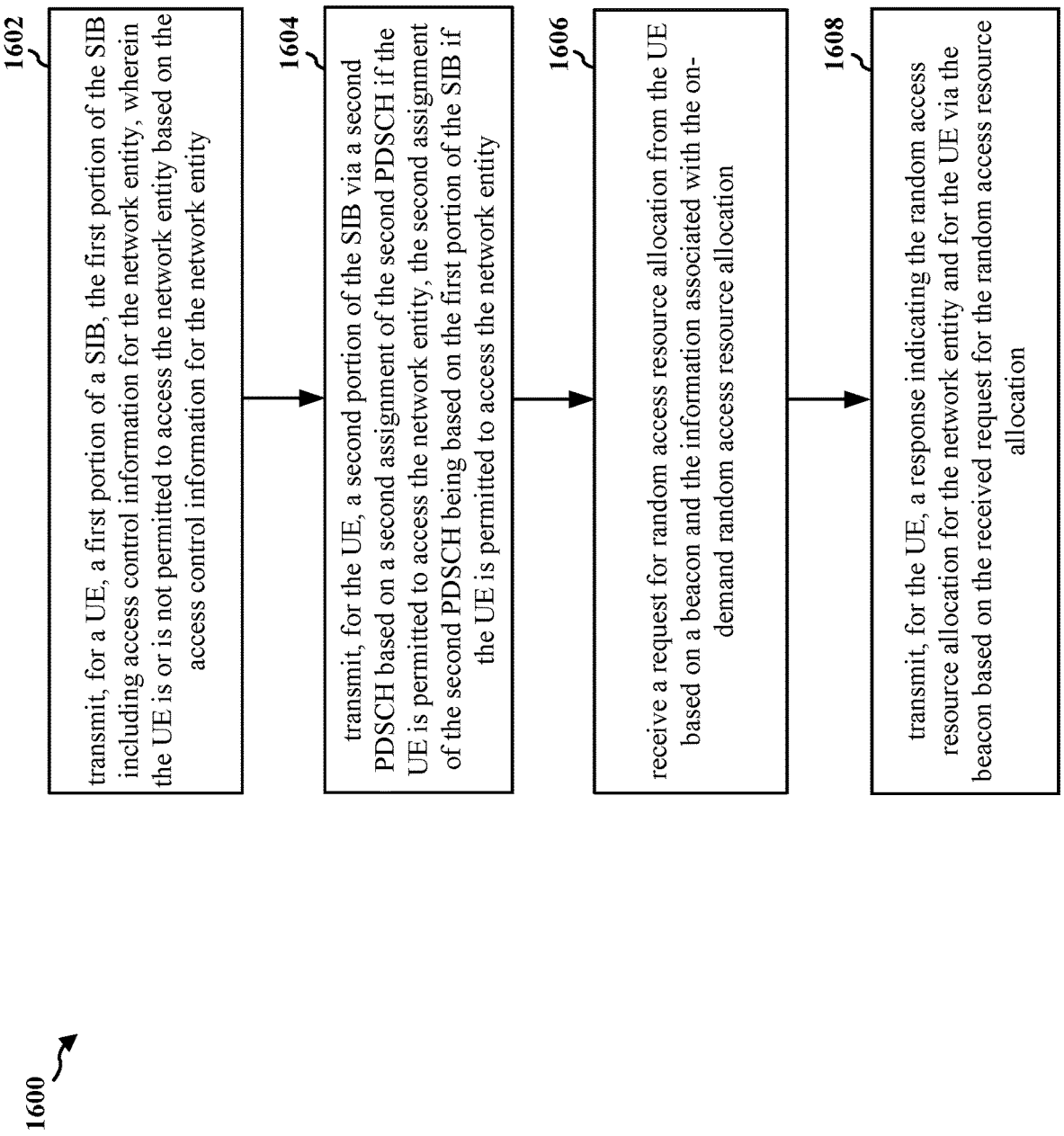
FIG. 16 is a flowchart of a method of wireless communication.

FIG. 16 is a flowchart 1600 of a method of wireless communication. The method may be performed by a network entity (e.g., the base station 102/310; the network entity 804/1702/1802). At 1602, the network entity may transmit, for a UE, a first portion of a SIB. The first portion of the SIB may include access control information for the network entity. The UE may be or may not be permitted to access the network entity based on the access control information for the network entity. For example, 1602 may be performed by the component 199 in FIG. 18. Referring to FIG. 8, at 808, the network entity 804 may transmit, for a UE 802, a first portion of a SIB.

At 1604, the network entity may transmit, for the UE, a second portion of the SIB via a second PDSCH based on a second assignment of the second PDSCH if the UE is permitted to access the network entity. The second assignment of the second PDSCH may be based on the first portion of the SIB if the UE is permitted to access the network entity. For example, 1604 may be performed by the component 199 in FIG. 18. Referring to FIG. 8, at 816, the network entity 804 may transmit, for the UE 802, a second portion of the SIB via a second PDSCH based on a second assignment of the second PDSCH if the UE 802 is permitted to access the network entity 804.

In one configuration, referring to FIG. 8, the second portion of the SIB, at 816, may include at least an indication of random access resource allocation for the network entity 804 and for the UE 802 and/or an indication of an assignment for a subsequent SIB transmission from the network entity 804.

In one configuration, referring to FIG. 8, the second portion of the SIB, at 816, may include information associated with on-demand random access resource allocation. At 1606, the network entity may receive a request for random access resource allocation from the UE based on a beacon and the information associated with the on-demand random access resource allocation. For example, 1606 may be performed by the component 199 in FIG. 18. Referring to FIG. 8, at 818*a*, the network entity 804 may receive a request for random access resource allocation from the UE 802 based on a beacon and the information associated with the on-demand random access resource allocation.

At 1608, the network entity may transmit, for the UE, a response indicating the random access resource allocation for the network entity and for the UE based on the received request for the random access resource allocation. For example, 1608 may be performed by the component 199 in FIG. 18. Referring to FIG. 8, at 818*b*, the network entity 804 may transmit, for the UE 802, a response indicating the random access resource allocation for the network entity 804 and for the UE 802 based on the received request for the random access resource allocation.

In one configuration, referring to FIG. 8, the first portion of the SIB, at 808, may include an indication of the second assignment of the second PDSCH. The indication of the second assignment may be associated with a second lookup table. The indication of the second assignment may include an index of an entry for the second assignment in the second lookup table. In one configuration, the second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

Figure 17:
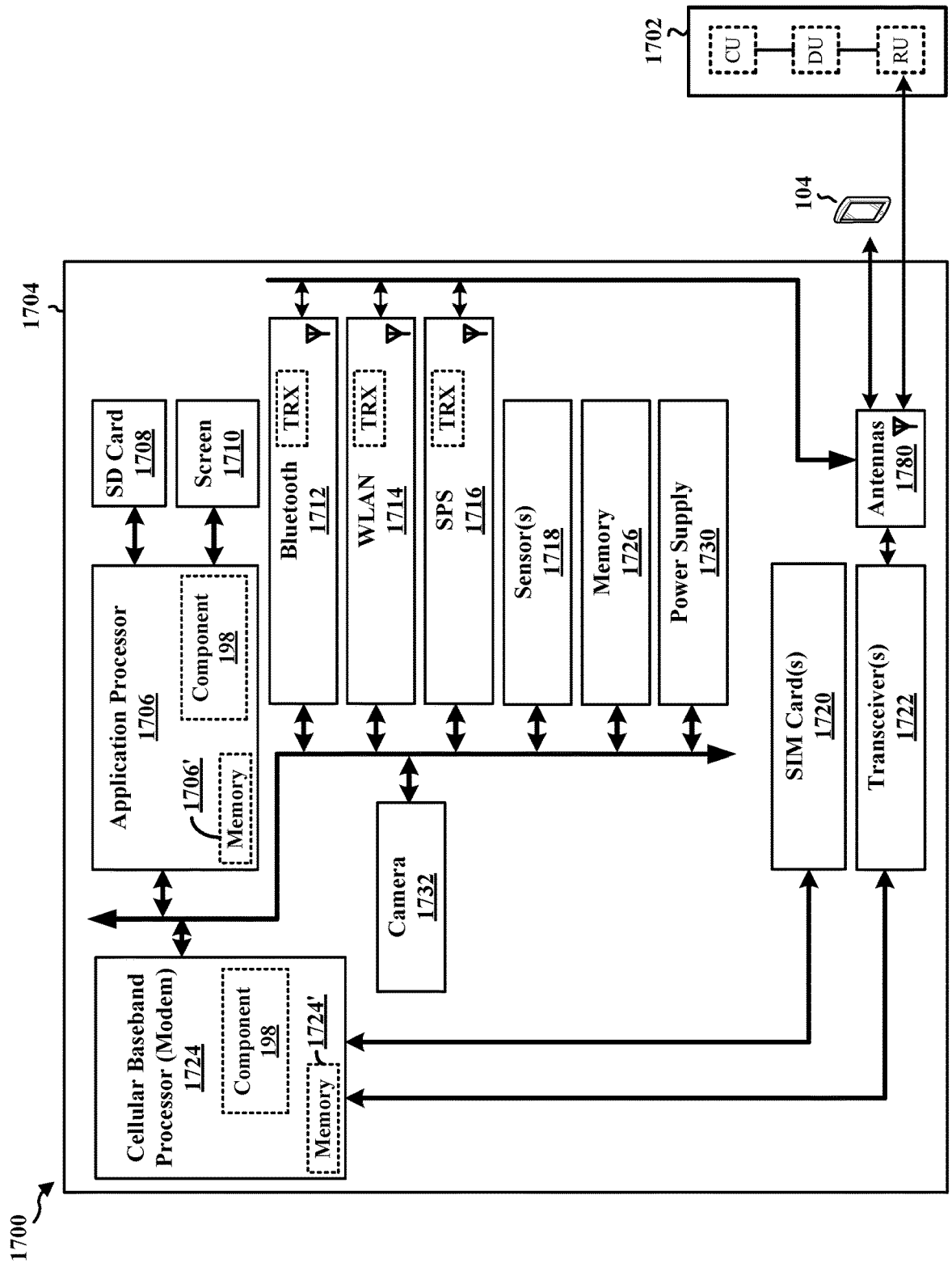
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the component 198 is configured to receive an indication of a first assignment of a first PDSCH via a PBCH from a network entity. The first PDSCH may include at least a first portion of a SIB. The component 198 is configured to receive the first portion of the SIB via the first PDSCH from the network entity based on the first assignment of the first PDSCH. The component 198 is configured to receive a first portion of a SIB from a network entity. The first portion of the SIB may include access control information for the network entity and may indicate an assignment of a second PDSCH if the access control information indicates that the UE is permitted to access the network entity. The component 198 is configured to identify whether the UE is permitted to access the network entity based on the access control information for the network entity. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving an indication of a first assignment of a first PDSCH via a PBCH from a network entity. The first PDSCH may include at least a first portion of a SIB. The apparatus 1704, and in particular the cellular baseband processor 1724 and/or the application processor 1706, includes means for receiving the first portion of the SIB via the first PDSCH from the network entity based on the first assignment of the first PDSCH. The apparatus 1704, and in particular the cellular baseband processor 1724 and/or the application processor 1706, includes means for receiving a first portion of a SIB from a network entity. The first portion of the SIB may include access control information for the network entity and may indicate an assignment of a second PDSCH if the access control information indicates that the UE is permitted to access the network entity. The apparatus 1704, and in particular the cellular baseband processor 1724 and/or the application processor 1706, includes means for identifying whether the UE is permitted to access the network entity based on the access control information for the network entity.

In one configuration, the indication of the first assignment of the first PDSCH may be associated with a first lookup table. The indication of the first assignment of the first PDSCH may include an index of an entry for the first assignment in the first lookup table. In one configuration, the first assignment of the first PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB. In one configuration, the first portion of the SIB may include access control information for the network entity. The apparatus 1704, and in particular the cellular baseband processor 1724 and/or the application processor 1706, includes means for identifying whether the UE is permitted to access the network entity based on the access control information for the network entity. In one configuration, the apparatus 1704, and in particular the cellular baseband processor 1724 and/or the application processor 1706, includes means for performing a network entity selection or re-selection operation if the UE is not permitted to access the network entity. In one configuration, the apparatus 1704, and in particular the cellular baseband processor 1724 and/or the application processor 1706, includes means for identifying a second assignment of a second PDSCH based at least on the received first portion of the SIB if the UE is permitted to access the network entity, the second PDSCH including a second portion of the SIB. The apparatus 1704, and in particular the cellular baseband processor 1724 and/or the application processor 1706, includes means for receiving the second portion of the SIB via the second PDSCH from the network entity. The apparatus 1704, and in particular the cellular baseband processor 1724 and/or the application processor 1706, includes means for identifying a random access resource allocation for the network entity based at least on the received second portion of the SIB. In one configuration, the second portion of the SIB may include at least an indication of the random access resource allocation for the network entity and for the UE or an indication of an assignment for a subsequent SIB transmission from the network entity. In one configuration, the second portion of the SIB may include information associated with on-demand random access resource allocation. The means for identifying the random access resource allocation for the network entity may be further configured to transmit, for the network entity, a request for the random access resource allocation based on a beacon and the information associated with the on-demand random access resource allocation; and receive a response indicating the random access resource allocation for the network entity and for the UE from the network entity based on the transmitted request for the random access resource allocation. In one configuration, the first portion of the SIB may include an indication of the second assignment of the second PDSCH. The indication of the second assignment may be associated with a second lookup table. The indication of the second assignment may include an index of an entry for the second assignment in the second lookup table. The second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
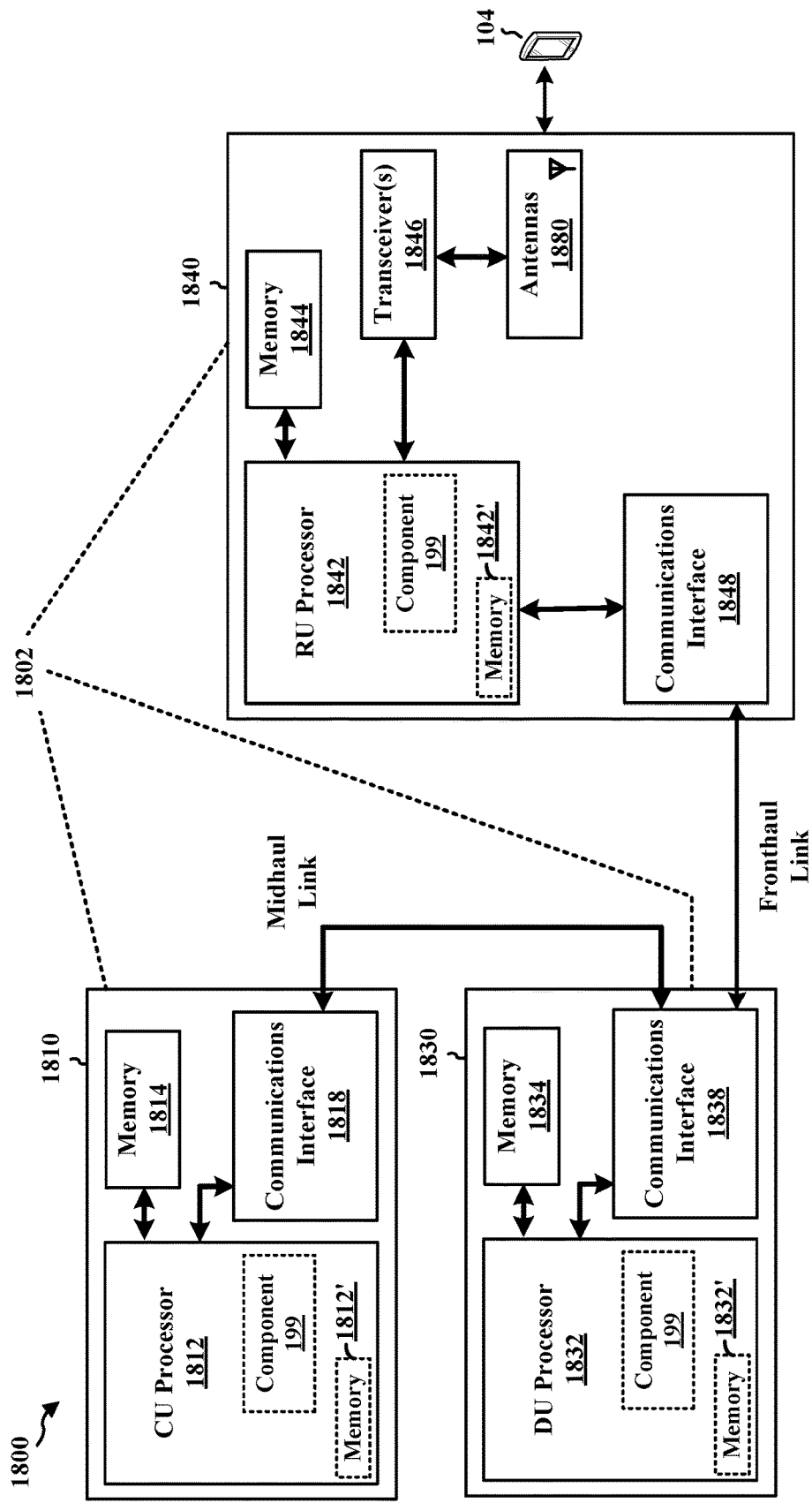
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, for a UE, an indication of a first assignment of a first PDSCH via a PBCH. The first PDSCH may include at least a first portion of a SIB. The component 199 is configured to transmit, for the UE, the first portion of the SIB via the first PDSCH based on the first assignment of the first PDSCH. The component 199 is configured to transmit, for a UE, a first portion of a SIB. The first portion of the SIB may include access control information for the network entity. The UE may be or may not be permitted to access the network entity based on the access control information for the network entity. The component 199 is configured to transmit, for the UE, a second portion of the SIB via a second PDSCH based on a second assignment of the second PDSCH if the UE is permitted to access the network entity. The second assignment of the second PDSCH may be based on the first portion of the SIB if the UE is permitted to access the network entity. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for transmitting, for a UE, an indication of a first assignment of a first PDSCH via a PBCH. The first PDSCH may include at least a first portion of a SIB. The network entity 1802 includes means for transmitting, for the UE, the first portion of the SIB via the first PDSCH based on the first assignment of the first PDSCH. The network entity 1802 includes means for transmitting, for a UE, a first portion of a SIB. The first portion of the SIB may include access control information for the network entity. The UE may be or may not be permitted to access the network entity based on the access control information for the network entity. The network entity 1802 includes means for transmitting, for the UE, a second portion of the SIB via a second PDSCH based on a second assignment of the second PDSCH if the UE is permitted to access the network entity. The second assignment of the second PDSCH may be based on the first portion of the SIB if the UE is permitted to access the network entity.

In one configuration, the indication of the first assignment of the first PDSCH may be associated with a first lookup table. The indication of the first assignment of the first PDSCH may include an index of an entry for the first assignment in the first lookup table. In one configuration, the first assignment of the first PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB. In one configuration, the first portion of the SIB may include access control information for the network entity. The UE may be or may not be permitted to access the network entity based on the access control information for the network entity. In one configuration, the network entity 1802 includes means for transmitting, for the UE, a second portion of the SIB via a second PDSCH based on a second assignment of the second PDSCH if the UE is permitted to access the network entity. The second assignment of the second PDSCH may be based on the first portion of the SIB. In one configuration, the second portion of the SIB may include at least an indication of random access resource allocation for the network entity and for the UE or an indication of an assignment for a subsequent SIB transmission from the network entity. In one configuration, the second portion of the SIB may include information associated with on-demand random access resource allocation. The network entity 1802 includes means for receiving a request for random access resource allocation from the UE based on a beacon and the information associated with the on-demand random access resource allocation. The network entity 1802 includes means for transmitting, for the UE, a response indicating the random access resource allocation for the network entity and for the UE based on the received request for the random access resource allocation. In one configuration, the first portion of the SIB may include an indication of the second assignment of the second PDSCH. The indication of the second assignment may be associated with a second lookup table. The indication of the second assignment may include an index of an entry for the second assignment in the second lookup table. The second assignment of the second PDSCH may correspond to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

The means may be the component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-18, a UE may receive an indication of a first assignment of a first PDSCH via a PBCH from a network entity. The first PDSCH may include at least a first portion of a SIB. The UE may receive the first portion of the SIB via the first PDSCH from the network entity based on the first assignment of the first PDSCH. The first portion of the SIB may include access control information for the network entity. The UE may identify whether the UE is permitted to access the network entity based on the access control information for the network entity. Accordingly, a UE may be able to identify whether the UE may camp on the network entity (e.g., whether the UE is authorized) without decoding a large SIB1. Further, a UE may be able to decode the SI without or with less blind decoding of the PDCCH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving an indication of a first assignment of a first PDSCH via a PBCH from a network entity, the first PDSCH including at least a first portion of a SIB; and receiving the first portion of the SIB via the first PDSCH from the network entity based on the first assignment of the first PDSCH.

Aspect 2 is the method of aspect 1, where the indication of the first assignment of the first PDSCH is associated with a first lookup table, and the indication of the first assignment of the first PDSCH includes an index of an entry for the first assignment in the first lookup table.

Aspect 3 is the method of any of aspects 1 and 2, where the first assignment of the first PDSCH corresponds to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

Aspect 4 is the method of any of aspects 1 to 3, where the first portion of the SIB includes access control information for the network entity, and the method further includes: identifying whether the UE is permitted to access the network entity based on the access control information for the network entity.

Aspect 5 is the method of aspect 4, further including: performing a network entity selection or re-selection operation if the UE is not permitted to access the network entity.

Aspect 6 is the method of aspect 4, further including: identifying a second assignment of a second PDSCH based at least on the received first portion of the SIB if the UE is permitted to access the network entity, the second PDSCH including a second portion of the SIB; receiving the second portion of the SIB via the second PDSCH from the network entity; and identifying a random access resource allocation for the network entity based at least on the received second portion of the SIB.

Aspect 7 is the method of aspect 6, where the second portion of the SIB includes at least an indication of the random access resource allocation for the network entity and for the UE or an indication of an assignment for a subsequent SIB transmission from the network entity.

Aspect 8 is the method of aspect 6, where the second portion of the SIB includes information associated with on-demand random access resource allocation, and identifying the random access resource allocation for the network entity further includes: transmitting, for the network entity, a request for the random access resource allocation based on a beacon and the information associated with the on-demand random access resource allocation; and receiving a response indicating the random access resource allocation for the network entity and for the UE from the network entity based on the transmitted request for the random access resource allocation.

Aspect 9 is the method of any of aspects 6 to 8, where the first portion of the SIB includes an indication of the second assignment of the second PDSCH, the indication of the second assignment is associated with a second lookup table, the indication of the second assignment includes an index of an entry for the second assignment in the second lookup table, and the second assignment of the second PDSCH corresponds to one or more of: a time-frequency resource allocation, a spatial relationship, a waveform, an MCS, a slot aggregation factor, a TBS scaling factor, a repetition number, a DM-RS bundling scheme, a TBS, or information for coverage enhancement of the SIB, or any combination thereof.

Aspect 10 is a method of wireless communication at a UE, including receiving a first portion of a SIB from a network entity, the first portion of the SIB including access control information for the network entity and indicating an assignment of a second PDSCH if the access control information indicates that the UE is permitted to access the network entity; and identifying whether the UE is permitted to access the network entity based on the access control information for the network entity.

Aspect 11 is the method of aspect 10, further including: performing a network entity selection or re-selection operation if the access control information indicates that the UE is not permitted to access the network entity.

Aspect 12 is the method of aspect 10, wherein the second PDSCH includes a second portion of the SIB, and the method further includes: receiving the second portion of the SIB via the second PDSCH from the network entity; and identify a random access resource allocation for the network entity based at least on the received second portion of the SIB.

Aspect 13 is the method of aspect 12, where the second portion of the SIB includes at least an indication of the random access resource allocation for the network entity and for the UE or an indication of an assignment for a subsequent SIB transmission from the network entity.

Aspect 14 is the method of aspect 12, where the second portion of the SIB includes information associated with on-demand random access resource allocation, and identifying the random access resource allocation for the network entity further includes: transmitting, for the network entity, a request for the random access resource allocation based on a beacon and the information associated with the on-demand random access resource allocation; and receiving a response indicating the random access resource allocation for the network entity and for the UE from the network entity based on the transmitted request for the random access resource allocation.

Aspect 15 is the method of any of aspects 12 to 14, where the indication of the second assignment is associated with a second lookup table and includes an index of an entry for the second assignment in the second lookup table, and the second assignment of the second PDSCH corresponds to one or more of: a time-frequency resource allocation, a spatial relationship, a waveform, an MCS, a slot aggregation factor, a TBS scaling factor, a repetition number, a DM-RS bundling scheme, a TBS, or information for coverage enhancement of the SIB, or any combination thereof.

Aspect 16 is a method of wireless communication at a network entity, including transmitting, for a UE, an indication of a first assignment of a first PDSCH via a PBCH, the first PDSCH including at least a first portion of a SIB; and transmitting, for the UE, the first portion of the SIB via the first PDSCH based on the first assignment of the first PDSCH.

Aspect 17 is the method of aspect 16, where the indication of the first assignment of the first PDSCH is associated with a first lookup table, and the indication of the first assignment of the first PDSCH includes an index of an entry for the first assignment in the first lookup table.

Aspect 18 is the method of any of aspects 16 and 17, where the first assignment of the first PDSCH corresponds to one or more of a time-frequency resource allocation, a spatial relationship, a waveform, an MCS, a slot aggregation factor, a TBS scaling factor, a repetition number, a DM-RS bundling scheme, a TBS, or information for coverage enhancement of the SIB.

Aspect 19 is the method of any of aspects 16 to 18, where the first portion of the SIB includes access control information for the network entity, and the UE is or is not permitted to access the network entity based on the access control information for the network entity.

Aspect 20 is the method of aspect 19, further including: transmitting, for the UE, a second portion of the SIB via a second PDSCH based on a second assignment of the second PDSCH if the UE is permitted to access the network entity, the second assignment of the second PDSCH being based on the first portion of the SIB.

Aspect 21 is the method of aspect 20, where the second portion of the SIB includes at least an indication of random access resource allocation for the network entity and for the UE or an indication of an assignment for a subsequent SIB transmission from the network entity.

Aspect 22 is the method of aspect 20, where the second portion of the SIB includes information associated with on-demand random access resource allocation, and the method further includes: receiving a request for random access resource allocation from the UE based on a beacon and the information associated with the on-demand random access resource allocation; and transmitting, for the UE, a response indicating the random access resource allocation for the network entity and for the UE based on the received request for the random access resource allocation.

Aspect 23 is the method of any of aspects 20 to 22, where the first portion of the SIB includes an indication of the second assignment of the second PDSCH, the indication of the second assignment is associated with a second lookup table, the indication of the second assignment includes an index of an entry for the second assignment in the second lookup table, and the second assignment of the second PDSCH corresponds to one or more of: a time-frequency resource allocation, a spatial relationship, a waveform, an MCS, a slot aggregation factor, a TBS scaling factor, a repetition number, a DM-RS bundling scheme, a TBS, or information for coverage enhancement of the SIB, or any combination thereof.

Aspect 24 is a method of wireless communication at a network entity, including transmitting, for a UE, a first portion of a SIB, the first portion of the SIB including access control information for the network entity, where the UE is or is not permitted to access the network entity based on the access control information for the network entity; and transmitting, for the UE, a second portion of the SIB via a second PDSCH based on a second assignment of the second PDSCH if the UE is permitted to access the network entity, the second assignment of the second PDSCH being based on the first portion of the SIB if the UE is permitted to access the network entity.

Aspect 25 is the method of aspect 24, where the second portion of the SIB includes at least an indication of random access resource allocation for the network entity and for the UE or an indication of an assignment for a subsequent SIB transmission from the network entity.

Aspect 26 is the method of aspect 24, where the second portion of the SIB includes information associated with on-demand random access resource allocation, and the method further includes: receiving a request for random access resource allocation from the UE based on a beacon and the information associated with the on-demand random access resource allocation; and transmitting, for the UE, a response indicating the random access resource allocation for the network entity and for the UE based on the received request for the random access resource allocation.

Aspect 27 is the method of any of aspects 24 to 26, where the first portion of the SIB includes an indication of the second assignment of the second PDSCH, the indication of the second assignment is associated with a second lookup table and includes an index of an entry for the second assignment in the second lookup table, and the second assignment of the second PDSCH corresponds to one or more of: a time-frequency resource allocation, a spatial relationship, a waveform, an MCS, a slot aggregation factor, a TBS scaling factor, a repetition number, a DM-RS bundling scheme, a TBS, or information for coverage enhancement of the SIB, or any combination thereof.

Aspect 28 is an apparatus for wireless communication including at least one processor coupled to a memory and, based at least in part on information stored in the memory, the at least one processor is configured to implement a method as in any of aspects 1 to 27.

Aspect 29 may be combined with aspect 28 and further includes a transceiver coupled to the at least one processor.

Aspect 30 is an apparatus for wireless communication including means for implementing any of aspects 1 to 27.

Aspect 31 is a non-transitory computer-readable storage medium storing computer executable code, where the code when executed by a processor causes the processor to implement any of aspects 1 to 27.

Various aspects have been described herein. These and other aspects are within the scope of the following claims.

What is claimed is:

1. An apparatus for wireless communication at a user equipment (UE), comprising:
  memory;
  a transceiver; and at least one processor coupled to the memory and the transceiver and, based at least in part on information stored in the memory, the at least one processor is configured to:
  receive, via the transceiver, an indication of a first assignment of a first physical downlink shared channel (PDSCH) via a physical broadcast channel (PBCH) from a network entity, the first PDSCH including at least a first portion of a system information block (SIB);
  receive, via the transceiver, the first portion of the SIB via the first PDSCH from the network entity based on the first assignment of the first PDSCH, wherein the first portion of the SIB includes access control information for the network entity;
  identify whether the UE is permitted to access the network entity based on the access control information for the network entity;
  identify a second assignment of a second PDSCH based at least on the received first portion of the SIB if the UE is permitted to access the network entity, the second PDSCH including a second portion of the SIB;
  receive, via the transceiver, the second portion of the SIB via the second PDSCH from the network entity; and
  identify a random access resource allocation for the network entity based at least on the received second portion of the SIB.

2. The apparatus of claim 1, wherein the indication of the first assignment of the first PDSCH is associated with a first lookup table, and the indication of the first assignment of the first PDSCH includes an index of an entry for the first assignment in the first lookup table.

3. The apparatus of claim 1, wherein the first assignment of the first PDSCH corresponds to one or more of a time-frequency resource allocation, a spatial relationship, a waveform, a modulation and coding scheme (MCS), a slot aggregation factor, a transport block size (TBS) scaling factor, a repetition number, a demodulation reference signal (DM-RS) bundling scheme, a TBS, or information for coverage enhancement of the SIB.

4. The apparatus of claim 1, the at least one processor being further configured to:
  perform a network entity selection or re-selection operation if the UE is not permitted to access the network entity.

5. The apparatus of claim 1, wherein the second portion of the SIB includes at least an indication of the random access resource allocation for the network entity and for the UE or an indication of an assignment for a subsequent SIB transmission from the network entity.

6. The apparatus of claim 1, wherein the second portion of the SIB includes information associated with on-demand random access resource allocation, and to identify the random access resource allocation for the network entity, the at least one processor is further configured to:
  transmit, for the network entity, a request for the random access resource allocation based on a beacon and the information associated with the on-demand random access resource allocation; and
  receive a response indicating the random access resource allocation for the network entity and for the UE from the network entity based on the transmitted request for the random access resource allocation.

7. The apparatus of claim 1, wherein the first portion of the SIB includes an indication of the second assignment of the second PDSCH, the indication of the second assignment is associated with a second lookup table, the indication of the second assignment includes an index of an entry for the second assignment in the second lookup table, and the second assignment of the second PDSCH corresponds to one or more of:
  a time-frequency resource allocation,
  a spatial relationship,
  a waveform,
  a modulation and coding scheme (MCS),
  a slot aggregation factor,
  a transport block size (TBS) scaling factor,
  a repetition number,
  a demodulation reference signal (DM-RS) bundling scheme,
  a TBS, or
  information for coverage enhancement of the SIB, or
  any combination thereof.

8. A method of wireless communication at a user equipment (UE), comprising:
  receiving an indication of a first assignment of a first physical downlink shared channel (PDSCH) via a physical broadcast channel (PBCH) from a network entity, the first PDSCH including at least a first portion of a system information block (SIB);
  receiving the first portion of the SIB via the first PDSCH from the network entity based on the first assignment of the first PDSCH, wherein the first portion of the SIB includes access control information for the network entity;
  identifying whether the UE is permitted to access the network entity based on the access control information for the network entity;
  identifying a second assignment of a second PDSCH based at least on the received first portion of the SIB if the UE is permitted to access the network entity, the second PDSCH including a second portion of the SIB;
  receiving the second portion of the SIB via the second PDSCH from the network entity; and
  identifying a random access resource allocation for the network entity based at least on the received second portion of the SIB.

9. The method of claim 8, wherein the indication of the first assignment of the first PDSCH is associated with a first lookup table, and the indication of the first assignment of the first PDSCH includes an index of an entry for the first assignment in the first lookup table.

10. The method of claim 8, wherein the first assignment of the first PDSCH corresponds to one or more of a time-frequency resource allocation, a spatial relationship, a waveform, a modulation and coding scheme (MCS), a slot aggregation factor, a transport block size (TBS) scaling factor, a repetition number, a demodulation reference signal (DM-RS) bundling scheme, a TBS, or information for coverage enhancement of the SIB.

11. The method of claim 8, further comprising:
  performing a network entity selection or re-selection operation if the UE is not permitted to access the network entity.

12. The method of claim 8, wherein the second portion of the SIB includes at least an indication of the random access resource allocation for the network entity and for the UE or an indication of an assignment for a subsequent SIB transmission from the network entity.

13. The method of claim 8, wherein the second portion of the SIB includes information associated with on-demand random access resource allocation, and identifying the random access resource allocation for the network entity further includes:
   transmitting, for the network entity, a request for the random access resource allocation based on a beacon and the information associated with the on-demand random access resource allocation; and
   receiving a response indicating the random access resource allocation for the network entity and for the UE from the network entity based on the transmitted request for the random access resource allocation.

14. The method of claim 8, wherein the first portion of the SIB includes an indication of the second assignment of the second PDSCH, the indication of the second assignment is associated with a second lookup table, the indication of the second assignment includes an index of an entry for the second assignment in the second lookup table, and the second assignment of the second PDSCH corresponds to one or more of:
   a time-frequency resource allocation,
   a spatial relationship,
   a waveform,
   a modulation and coding scheme (MCS),
   a slot aggregation factor,
   a transport block size (TBS) scaling factor,
   a repetition number,
   a demodulation reference signal (DM-RS) bundling scheme,
   a TBS, or
   information for coverage enhancement of the SIB, or any combination thereof.

15. An apparatus for wireless communication at a user equipment (UE), comprising:
   memory;
   a transceiver; and
   at least one processor coupled to the memory and the transceiver and, based at least in part on information stored in the memory, the at least one processor is configured to:
      receive, via the transceiver, a first portion of a system information block (SIB) from a network entity, the first portion of the SIB including access control information for the network entity and indicating an assignment of a second PDSCH if the access control information indicates that the UE is permitted to access the network entity; and
      identify whether the UE is permitted to access the network entity based on the access control information for the network entity.

16. The apparatus of claim 15, the at least one processor being further configured to:
   perform a network entity selection or re-selection operation if the access control information indicates that the UE is not permitted to access the network entity.

17. The apparatus of claim 15, wherein the second PDSCH includes a second portion of the SIB, the at least one processor being further configured to:
   receive, via the transceiver, the second portion of the SIB via the second PDSCH from the network entity; and
   identify a random access resource allocation for the network entity based at least on the received second portion of the SIB.

18. The apparatus of claim 17, wherein the second portion of the SIB includes at least an indication of the random access resource allocation for the network entity and for the UE or an indication of an assignment for a subsequent SIB transmission from the network entity.

19. The apparatus of claim 17, wherein the second portion of the SIB includes information associated with on-demand random access resource allocation, and to identify the random access resource allocation for the network entity, the at least one processor is further configured to:
   transmit, via the transceiver for the network entity, a request for the random access resource allocation based on a beacon and the information associated with the on-demand random access resource allocation; and
   receive a response indicating the random access resource allocation for the network entity and for the UE from the network entity based on the transmitted request for the random access resource allocation.

20. The apparatus of claim 17, wherein the indication of the second assignment is associated with a second lookup table and includes an index of an entry for the second assignment in the second lookup table, and the second assignment of the second PDSCH corresponds to one or more of:
   a time-frequency resource allocation,
   a spatial relationship,
   a waveform,
   a modulation and coding scheme (MCS),
   a slot aggregation factor,
   a transport block size (TBS) scaling factor,
   a repetition number,
   a demodulation reference signal (DM-RS) bundling scheme,
   a TBS, or
   information for coverage enhancement of the SIB, or any combination thereof.

21. A method of wireless communication at a user equipment (UE), comprising:
   receiving a first portion of a system information block (SIB) from a network entity, the first portion of the SIB including access control information for the network entity and indicating an assignment of a second PDSCH if the access control information indicates that the UE is permitted to access the network entity; and
   identifying whether the UE is permitted to access the network entity based on the access control information for the network entity.

22. The method of claim 21, further comprising:
   performing a network entity selection or re-selection operation if the access control information indicates that the UE is not permitted to access the network entity.

23. The method of claim 21, wherein the second PDSCH includes a second portion of the SIB, and the method further comprises:
   receiving the second portion of the SIB via the second PDSCH from the network entity; and
   identifying a random access resource allocation for the network entity based at least on the received second portion of the SIB.

24. The method of claim 23, wherein the second portion of the SIB includes at least an indication of the random access resource allocation for the network entity and for the UE or an indication of an assignment for a subsequent SIB transmission from the network entity.

25. The method of claim 23, wherein the second portion of the SIB includes information associated with on-demand random access resource allocation, and identifying the random access resource allocation for the network entity further includes:
   transmitting, for the network entity, a request for the random access resource allocation based on a beacon and the information associated with the on-demand random access resource allocation; and receiving a response indicating the random access resource allocation for the network entity and for the UE from the network entity based on the transmitted request for the random access resource allocation.

26. The method of claim 23, wherein the indication of the second assignment is associated with a second lookup table and includes an index of an entry for the second assignment in the second lookup table, and the second assignment of the second PDSCH corresponds to one or more of:
- a time-frequency resource allocation,
- a spatial relationship, a waveform,
- a modulation and coding scheme (MCS),
- a slot aggregation factor,
- a transport block size (TBS) scaling factor,
- a repetition number,
- a demodulation reference signal (DM-RS) bundling scheme,
- a TBS, or
- information for coverage enhancement of the SIB, or
- any combination thereof.

27. An apparatus for wireless communication at a network entity, comprising:
   memory; and
   at least one processor coupled to the memory and, based at least in part on information stored in the memory, the at least one processor is configured to:
      transmit, for a user equipment (UE), an indication of a first assignment of a first physical downlink shared channel (PDSCH) via a physical broadcast channel (PBCH), the first PDSCH including at least a first portion of a system information block (SIB); and
      transmit, for the UE, the first portion of the SIB via the first PDSCH based on the first assignment of the first PDSCH, wherein the first portion of the SIB includes access control information for the network entity, and the UE is or is not permitted to access the network entity based on the access control information for the network entity; and
      transmit, for the UE, a second portion of the SIB via a second PDSCH based on a second assignment of the second PDSCH if the UE is permitted to access the network entity, the second assignment of the second PDSCH being based on the first portion of the SIB.

28. The apparatus of claim 27, wherein the indication of the first assignment of the first PDSCH is associated with a first lookup table, and the indication of the first assignment of the first PDSCH includes an index of an entry for the first assignment in the first lookup table.

29. The apparatus of claim 27, wherein the first assignment of the first PDSCH corresponds to one or more of a time-frequency resource allocation, a spatial relationship, a waveform, a slot aggregation factor, a transport block size (TBS) scaling factor, a repetition number, a demodulation reference signal (DM-RS) bundling scheme, a modulation and coding scheme (MCS), a TBS, or information for coverage enhancement of the SIB.

30. The apparatus of claim 27, wherein the second portion of the SIB includes at least an indication of random access resource allocation for the network entity and for the UE or an indication of an assignment for a subsequent SIB transmission from the network entity.

31. The apparatus of claim 27, wherein the second portion of the SIB includes information associated with on-demand random access resource allocation, and the at least one processor is further configured to:

receive a request for random access resource allocation from the UE based on a beacon and the information associated with the on-demand random access resource allocation; and transmit, for the UE, a response indicating the random access resource allocation for the network entity and for the UE based on the received request for the random access resource allocation.

32. The apparatus of claim 27, wherein the first portion of the SIB includes an indication of the second assignment of the second PDSCH, the indication of the second assignment is associated with a second lookup table, the indication of the second assignment includes an index of an entry for the second assignment in the second lookup table, and the second assignment of the second PDSCH corresponds to one or more of:
- a time-frequency resource allocation,
- a spatial relationship,
- a waveform,
- a modulation and coding scheme (MCS),
- a slot aggregation factor,
- a transport block size (TBS) scaling factor,
- a repetition number,
- a demodulation reference signal (DM-RS) bundling scheme,
- a TBS, or
- information for coverage enhancement of the SIB, or
- any combination thereof.

33. The apparatus of claim 27, further comprising a transceiver coupled to the at least one processor, the transceiver being configured to transmit the indication of the assignment of the first PDSCH and the first portion of the SIB.

34. A method of wireless communication at a network entity, comprising:
   transmitting, for a user equipment (UE), an indication of a first assignment of a first physical downlink shared channel (PDSCH) via a physical broadcast channel (PBCH), the first PDSCH including at least a first portion of a system information block (SIB);
   transmitting, for the UE, the first portion of the SIB via the first PDSCH based on the first assignment of the first PDSCH, wherein the first portion of the SIB includes access control information for the network entity, and the UE is or is not permitted to access the network entity based on the access control information for the network entity; and
   transmitting, for the UE, a second portion of the SIB via a second PDSCH based on a second assignment of the second PDSCH if the UE is permitted to access the network entity, the second assignment of the second PDSCH being based on the first portion of the SIB.

35. The method of claim 34, wherein the indication of the first assignment of the first PDSCH is associated with a first lookup table, and the indication of the first assignment of the first PDSCH includes an index of an entry for the first assignment in the first lookup table.

36. The method of claim 34, wherein the first assignment of the first PDSCH corresponds to one or more of a time-frequency resource allocation, a spatial relationship, a waveform, a slot aggregation factor, a transport block size (TBS) scaling factor, a repetition number, a demodulation reference signal (DM-RS) bundling scheme, a modulation and coding scheme (MCS), a TBS, or information for coverage enhancement of the SIB.

37. The method of claim 34, wherein the second portion of the SIB includes at least an indication of random access resource allocation for the network entity and for the UE or an indication of an assignment for a subsequent SIB transmission from the network entity.

38. The method of claim 34, wherein the second portion of the SIB includes information associated with on-demand random access resource allocation, and the method further includes:
receiving a request for random access resource allocation from the UE based on a beacon and the information associated with the on-demand random access resource allocation; and
transmitting, for the UE, a response indicating the random access resource allocation for the network entity and for the UE based on the received request for the random access resource allocation.

39. The method of claim 34, wherein the first portion of the SIB includes an indication of the second assignment of the second PDSCH, the indication of the second assignment is associated with a second lookup table, the indication of the second assignment includes an index of an entry for the second assignment in the second lookup table, and the second assignment of the second PDSCH corresponds to one or more of:
a time-frequency resource allocation,
a spatial relationship,
a waveform,
a modulation and coding scheme (MCS),
a slot aggregation factor,
a transport block size (TBS) scaling factor,
a repetition number,
a demodulation reference signal (DM-RS) bundling scheme,
a TBS, or
information for coverage enhancement of the SIB, or any combination thereof.

40. An apparatus for wireless communication at a network entity, comprising:
a memory; and
at least one processor coupled to the memory and, based at least in part on information stored in the memory, the at least one processor is configured to:
transmit, for a user equipment (UE), a first portion of a system information block (SIB), the first portion of the SIB including access control information for the network entity, wherein the UE is or is not permitted to access the network entity based on the access control information for the network entity; and
transmit, for the UE, a second portion of the SIB via a second PDSCH based on a second assignment of the second PDSCH if the UE is permitted to access the network entity, the second assignment of the second PDSCH being based on the first portion of the SIB if the UE is permitted to access the network entity.

41. The apparatus of claim 40, wherein the second portion of the SIB includes at least an indication of random access resource allocation for the network entity and for the UE or an indication of an assignment for a subsequent SIB transmission from the network entity.

42. The apparatus of claim 40, wherein the second portion of the SIB includes information associated with on-demand random access resource allocation, and the at least one processor is further configured to:
receive a request for random access resource allocation from the UE based on a beacon and the information associated with the on-demand random access resource allocation; and
transmit, for the UE, a response indicating the random access resource allocation for the network entity and for the UE based on the received request for the random access resource allocation.

43. The apparatus of claim 40, wherein the first portion of the SIB includes an indication of the second assignment of the second PDSCH, the indication of the second assignment is associated with a second lookup table and includes an index of an entry for the second assignment in the second lookup table, and the second assignment of the second PDSCH corresponds to one or more of:
a time-frequency resource allocation,
a spatial relationship,
a waveform,
a modulation and coding scheme (MCS),
a slot aggregation factor,
a transport block size (TBS) scaling factor,
a repetition number,
a demodulation reference signal (DM-RS) bundling scheme,
a TBS, or
information for coverage enhancement of the SIB, or any combination thereof.

44. The apparatus of claim 40, further comprising a transceiver coupled to the at least one processor, the transceiver being configured to transmit the first portion of the SIB.

45. A method of wireless communication at a network entity, comprising:
transmitting, for a user equipment (UE), a first portion of a system information block (SIB), the first portion of the SIB including access control information for the network entity, wherein the UE is or is not permitted to access the network entity based on the access control information for the network entity; and
transmitting, for the UE, a second portion of the SIB via a second PDSCH based on a second assignment of the second PDSCH if the UE is permitted to access the network entity, the second assignment of the second PDSCH being based on the first portion of the SIB if the UE is permitted to access the network entity.

46. The method of claim 45, wherein the second portion of the SIB includes at least an indication of random access resource allocation for the network entity and for the UE or an indication of an assignment for a subsequent SIB transmission from the network entity.

47. The method of claim 45, wherein the second portion of the SIB includes information associated with on-demand random access resource allocation, and the method further includes:
receiving a request for random access resource allocation from the UE based on a beacon and the information associated with the on-demand random access resource allocation; and
transmitting, for the UE, a response indicating the random access resource allocation for the network entity and for the UE based on the received request for the random access resource allocation.

48. The method of claim 45, wherein the first portion of the SIB includes an indication of the second assignment of the second PDSCH, the indication of the second assignment is associated with a second lookup table and includes an index of an entry for the second assignment in the second lookup table, and the second assignment of the second PDSCH corresponds to one or more of:
a time-frequency resource allocation,
a spatial relationship, a waveform,
a modulation and coding scheme (MCS),
a slot aggregation factor,
a transport block size (TBS) scaling factor,
a repetition number,
a demodulation reference signal (DM-RS) bundling scheme,
a TBS, or
information for coverage enhancement of the SIB, or any combination thereof.

\* \* \* \* \*